(12) United States Patent
Sahoo et al.

(10) Patent No.: US 11,672,373 B2
(45) Date of Patent: Jun. 13, 2023

(54) BEVERAGE FORMING APPARATUS, METHOD, AND CARTRIDGE

(71) Applicants: Samir Prakash Sahoo, Toronto (CA); Bhavish Satyapal Bhatia, Austin, TX (US)

(72) Inventors: Samir Prakash Sahoo, Toronto (CA); Bhavish Satyapal Bhatia, Austin, TX (US)

(*) Notice: Subject to any disclaimer, the term of this patent is extended or adjusted under 35 U.S.C. 154(b) by 51 days.

(21) Appl. No.: 16/971,663

(22) PCT Filed: Feb. 27, 2019

(86) PCT No.: PCT/US2019/019778
§ 371 (c)(1),
(2) Date: Aug. 20, 2020

(87) PCT Pub. No.: WO2019/168939
PCT Pub. Date: Sep. 6, 2019

(65) Prior Publication Data
US 2020/0390271 A1    Dec. 17, 2020

Related U.S. Application Data

(60) Provisional application No. 62/638,056, filed on Mar. 2, 2018.

(51) Int. Cl.
A47J 31/40    (2006.01)
A47J 31/52    (2006.01)
A23F 3/18     (2006.01)
A47J 31/44    (2006.01)
(Continued)

(52) U.S. Cl.
CPC ............ *A47J 31/407* (2013.01); *A23F 3/18* (2013.01); *A47J 31/4489* (2013.01); *A47J 31/5253* (2018.08); *A47J 31/56* (2013.01); *B65D 85/812* (2013.01)

(58) Field of Classification Search
CPC .. A47J 31/407; A47J 31/3628; A47J 31/3633; A47J 31/3638; A47J 31/5253; A47J 31/4489; A47J 31/56
USPC ......... 99/293, 295, 287, 297, 315, 318, 385, 99/300, 292, 307, 312, 323, 319
See application file for complete search history.

(56) References Cited

U.S. PATENT DOCUMENTS 5,207,148 A    5/1993  Anderson et al.
6,713,110 B2   3/2004  Imboden et al.
(Continued)

*Primary Examiner* — Phuong T Nguyen
(74) *Attorney, Agent, or Firm* — Maschoff Brennan

(57) ABSTRACT

There is disclosed a method for forming tea using a tea material, the method includes providing a vessel comprising an internal space configured to receive a liquid, inserting a container assembly into the vessel, the container assembly configured to contain the tea material and allow the liquid to interact with the tea material when submerged within the liquid, injecting steam through a double-walled nozzle into the vessel to heat the liquid while maintaining an exterior surface of the steam nozzle below the temperature of the steam, and allowing the tea material to stew within the liquid to form the tea. There is also disclosed an apparatus for forming a tea configured to inject steam into a vessel to heat a liquid to be infused with a tea material, and a beverage cartridge for forming a tea to be deposited into the vessel.

9 Claims, 25 Drawing Sheets

(51) Int. Cl.
*A47J 31/56* (2006.01)
*B65D 85/812* (2006.01)

(56) References Cited

U.S. PATENT DOCUMENTS

| | | | |
|---|---|---|---|
| 7,640,845 B2* | 1/2010 | Woodnorth | A47J 31/54 |
| | | | 99/302 R |
| 2010/0154648 A1* | 6/2010 | Angeletti | A47J 31/4489 |
| | | | 99/293 |
| 2012/0107455 A1 | 5/2012 | Briggs | |
| 2012/0222561 A1 | 9/2012 | Tonelli et al. | |
| 2015/0327719 A1* | 11/2015 | Burrows | A47J 31/3628 |
| | | | 99/283 |
| 2016/0022087 A1 | 1/2016 | Han et al. | |

\* cited by examiner

BEVERAGE FORMING APPARATUS, METHOD, AND CARTRIDGE

RELATED APPLICATIONS

This application claims priority to U.S. provisional application Ser. No. 62/638,056, filed Mar. 2, 2018, which is incorporated herein in its entirety by reference.

TECHNICAL FIELD

The present invention relates to an apparatus and methods for using a tea packet or beverage cartridge with liquids to form a beverage.

BACKGROUND

Forming tea from pre-packaged beverage precursors, for example a tea bag or tea packet housing tea leaves within a filter bag, which are submerged into a heated liquid, such as water, is commonly used. To brew a tea using such a pre-packaged beverage precursor, the tea bag may be submerged into a cup containing hot water and allowed to remain submerged to stew such that the tea leaf flavors infuse into the water. The filter bag prevents the tea leaves from mixing into the water or leaving behind undesirable tea leaves floating in the water after the tea bag has been removed from the cup prior to consumption.

To make chai tea, black tea is submerged or deposited into a liquid, typically milk heated in a pot over a stove. Flavors from the black tea leaves are allowed to infuse into the milk within the heated pot. The tea leaves, which typically float on the surface of the milk, are subsequently strained or manually removed from the milk after allowing the tea leaves to stew for a period of time. However, heating milk in a pot causes milk residue to build up and form deposits on the hot surfaces of the pot, making clean-up of the pot difficult and time consuming. Also, removing all the tea leaves from the milk also requires added time, and in some instances, all the tea leaves may not be removed.

Devices exist that automate the process of making a beverage such as coffee or tea. For example, a conventional coffee machine heats water that is delivered to a filter holding coffee grinds. The hot water passes through the filter after the coffee flavors have infused into the water, resulting in a coffee beverage.

Some beverage machines exist that use a disposable cartridge to form a beverage. For example, such devices utilize single-serve packs containing ground coffee which can be inserted into such a device to puncture the top of the pack so as to allow hot water to be injected into the pack. Brewed coffee may then be ejected from the pack and into a cup via a pierced bottom of the pack to allow the beverage to flow out from the pack. Such machines have become widely popular largely due to their convenience where a single cup of coffee can be made without much of a cleanup of the filters of the device, or other components of the device.

There exists a need, therefore, for improved beverage forming devices that can provide for such conveniences for the making of chai tea with milk and other like beverages, and subsequent clean-up.

SUMMARY

It is therefore an aim of the present invention to address the above mentioned needs and other issues.

In accordance with an embodiment of the invention, there is provided a method for forming tea using a tea material. The method includes the steps of providing a vessel defining an internal space configured to receive a liquid, inserting a tea packet/container/assembly into the vessel, the tea packet/container/assembly configured to contain the tea material and allow the liquid to interact with the tea material when submerged within the liquid, injecting steam into the vessel via a double-walled steam nozzle to heat the liquid, and allowing the tea material to stew within the liquid to form the tea.

The double-walled steam nozzle provides a thermal buffer such that steam may be delivered from the inner area of the steam nozzle without overheating the liquid immediately adjacent the outer nozzle surface. The double-walled steam nozzle maintains an exterior surface of the steam nozzle below the temperature of the steam and thus avoids formation of surface deposits by liquid in contact with the steam nozzle, which greatly reduces the need to clean nozzle surfaces.

In accordance with an embodiment of the method for forming tea using a tea material, the method further includes suspending the tea packet/container/assembly within the internal space of the vessel when allowing the tea material to stew within the liquid to form the tea.

In accordance with an embodiment of the method for forming tea using a tea material, the vessel includes a cup, the cup includes a base, a lip, and a side wall between the lip and the base defining the internal space, such that suspending the container assembly within the internal space of the cup includes supporting the tea packet/container assembly from the sidewall or lip.

In accordance with an embodiment of the method for forming tea using a tea material, the tea packet/container assembly includes a permeable housing configured to house the tea material, and a handle having a first end comprising a hook configured to engage the sidewall or lip of the cup to support the permeable housing within the internal space of the cup at a predetermined depth or distance from the lip, and a second end in connection with the permeable housing.

In accordance with an embodiment of the method for forming tea using a tea material, the step of suspending the tea packet/container/assembly within the internal space of the vessel includes supporting the tea packet/container assembly from an associated beverage forming machine.

In accordance with an embodiment of the method for forming tea using a tea material, the step of injecting steam into the vessel includes inserting a nozzle into the vessel, the nozzle having a double-walled configuration configured to output the steam from within the interior nozzle while the liquid in the vessel contacts the outer nozzle wall.

In some embodiments, the outer surface/wall comprises an insulator material.

In some embodiments, the steam nozzle dispenses steam tangentially/radially through apertures defined at the lower end of the steam nozzle. In some embodiments, the apertures are configured and arranged to produce a swirling or vortex effect within the liquid.

In accordance with an embodiment of the method for forming tea using a tea material, the method further including the step of positioning the nozzle output proximate to a bottom of the vessel.

In accordance with an embodiment of the method for forming tea using a tea material, the method further including using a temperature sensor to control the injecting of steam in each of a steaming mode to heat the liquid and a simmering mode to slowly heat or maintain the liquid at a predetermined temperature.

In accordance with an embodiment of the method for forming tea using a tea material, such that allowing the tea material to stew within the liquid includes allowing the tea material to stew within the liquid for a duration ranging between 3 to 8 minutes.

In accordance with an embodiment of the method for forming tea using a tea material, such that the step of injecting steam dilutes the liquid with water up to approximately a 50% volume of the liquid.

In accordance with an embodiment of the method for forming tea using a tea material, the tea material includes black tea and the liquid includes milk.

In accordance with another embodiment, there is provided a method for forming a beverage using a tea packet/cartridge having a tea material contained within a portion of the tea packet/cartridge. The method for forming a beverage using a tea packet/cartridge having a tea material contained within a portion of the tea packet/cartridge includes providing a beverage forming machine having a cartridge chamber having an input port to receive the tea packet/cartridge and an output port to eject the portion of the tea packet/cartridge containing the tea material, a vessel juxtaposed to the output port, the vessel configured to hold a liquid and receive the ejected portion of the tea packet/cartridge containing the tea material, and a boiler and steam nozzle configured to inject steam into the vessel to heat the liquid. The method for forming a beverage using a tea packet/cartridge having a tea material contained within a portion of the tea packet/cartridge associating the tea packet/cartridge with the cartridge chamber further includes ejecting the portion of the tea packet/cartridge containing the tea material via the output port into the vessel; and heating the liquid with the steam injected into the vessel, wherein the tea material stews with the liquid to infuse the liquid with the tea material to form the beverage.

In some embodiments, the steam is injected into the liquid via a steam nozzle having an outer surface thereof insulated to prevent deposit formation of the liquid on the outer surface. In some embodiments, the outer surface is insulated by an air-gap formed between a double-walled configuration. In some embodiments, the outer surface is insulated by an insulator such as silicone. Preferably, the outer surface provides a non-stick surface to minimize deposit formation.

In accordance with an embodiment, the method for forming a beverage using a tea packet/cartridge having a tea material contained within a portion of the tea packet/cartridge further includes closing the cartridge chamber to at least partially enclose the tea packet/cartridge.

In accordance with an embodiment of the method for forming a beverage using a tea packet/cartridge having a tea material contained within a portion of the tea packet/cartridge, the method further includes separating the portion of the tea packet/cartridge containing the tea material from the tea packet/cartridge using a utensil actionable on the tea packet/cartridge in response to the closing of the cartridge chamber.

In accordance with an embodiment of the method for forming a beverage using a tea packet/cartridge having a tea material contained within a portion of the tea packet/cartridge, the method further includes separating the portion of the tea packet/cartridge containing the tea material from the tea packet/cartridge by applying a torque to the tea packet/cartridge in response to the closing of the cartridge chamber.

In accordance with an embodiment of the method for forming a beverage using a tea packet/cartridge having a tea material contained within a portion of the tea packet/cartridge, the method further includes suspending the portion of the tea packet/cartridge containing the tea material within the vessel by a string extending from the cartridge chamber.

In accordance with an embodiment of the method for forming a beverage using a tea packet/cartridge having a tea material contained within a portion of the tea packet/cartridge, the method further includes connecting the vessel to the beverage forming machine such that the cartridge chamber and the vessel are in communication via the output port.

In accordance with an embodiment of the method for forming a beverage using a tea packet/cartridge having a tea material contained within a portion of the tea packet/cartridge, the method further includes connecting the vessel to the beverage forming machine such that the cartridge chamber and the vessel are fluidly sealed.

In accordance with an embodiment of the method for forming a beverage using a tea packet/cartridge having a tea material contained within a portion of the tea packet/cartridge, closing the cartridge chamber includes moving a lid associated with the beverage forming machine, the lid being movable between an open and a closed position to open and close the cartridge chamber, wherein the movement of the lid to a closed position acts on the beverage cartridge to separate the portion of the beverage cartridge containing the tea material from the tea packet/cartridge.

In accordance with an embodiment of the method for forming a beverage using a tea packet/cartridge having a tea material contained within a portion of the tea packet/cartridge, the method further includes heating the liquid with the steam injected into the vessel further includes inserting a double-walled steam nozzle within the vessel. The steam nozzle is configured with tangential or radial apertures to generate a swirling or vortex effect within the liquid during steam injections.

In accordance with an embodiment of the method for forming a beverage using a beverage cartridge having a tea material contained within a portion of the tea packet/cartridge, the method further includes opening the output port to allow the portion of the tea packet/cartridge containing the tea material to be ejected subsequent to heating the liquid.

In accordance with another aspect, there is provided an apparatus for forming a beverage in a vessel holding a liquid using a tea material contained within a portion of a tea packet/cartridge. The apparatus includes a cartridge chamber arranged to receive the tea packet/cartridge and to deposit the portion of the tea packet/cartridge containing the tea material into the vessel, a reservoir for holding a supply of water, a boiler supported by the frame in fluid communication with the reservoir, the boiler configured to generate steam from the water supplied from the reservoir, and a double-walled nozzle supported by the frame in fluid communication with the boiler, the nozzle configured to inject the steam into the vessel to heat the liquid causing the deposited tea material to infuse the liquid and form the beverage within the vessel.

In accordance with an embodiment, the apparatus for forming a beverage further includes a vessel for holding the liquid, the vessel positionable adjacent to the cartridge chamber to receive the portion of the beverage cartridge containing the tea material from the cartridge chamber.

In accordance with an embodiment, the apparatus for forming a beverage further includes a lid that is movable between an opened and a closed position to open and close the cartridge chamber, the cartridge chamber adapted to substantially enclose the beverage cartridge when the lid is in a closed position and to engage the tea packet/cartridge to separate the tea material from the tea packet/cartridge in response to the closing of the cartridge chamber.

In accordance with an embodiment, the apparatus for forming a beverage further includes a separator for separating the portion containing the tea material from the tea packet/cartridge.

In accordance with an embodiment of the apparatus for forming a beverage, the separator separates the tea material from the tea packet/cartridge by applying a cutting action to the tea packet/cartridge.

In accordance with an embodiment of the apparatus for forming a beverage, the separator includes a blade.

In accordance with an embodiment of the apparatus for forming a beverage, the separator separates the portion containing the tea material from the tea packet/cartridge by applying a twisting action to the tea packet/cartridge.

In accordance with an embodiment of the apparatus for forming a beverage, the separator is provided on the lid and acts upon the tea packet/cartridge in response to the closing of the cartridge chamber.

In accordance with an embodiment of the apparatus for forming a beverage, the beverage cartridge includes a connection assembly configured to be removably securable to the apparatus for forming a beverage, a container assembly configured to house the tea material, and a frangible portion connecting the container assembly and connection assembly, the frangible portion being breakable to separate the container assembly from the connection assembly.

In accordance with an embodiment of the apparatus for forming a beverage, the cartridge chamber and the vessel are juxtaposed, the cartridge chamber further having an output port juxtaposed to the vessel and arranged to direct the portion containing the tea material into the vessel.

In accordance with an embodiment of the apparatus for forming a beverage the housing and the vessel are removably connectable.

In accordance with an embodiment of the apparatus for forming a beverage the nozzle is movable towards and away from the housing and correspondingly towards and away from a base of the vessel when the vessel is positioned adjacent to the cartridge chamber.

In accordance with an embodiment of the apparatus for forming a beverage, the apparatus further includes an actuator configured to move the nozzle.

In accordance with an embodiment of the apparatus for forming a beverage the nozzle includes one or more nozzle outputs angled relative to the longitudinal axis of the vessel when the vessel is positioned adjacent to the cartridge to direct steam and agitate the liquid to form a circular vortex in the liquid. In some embodiments, radial apertures along the steam nozzle further contribute to the vortex effect.

In accordance with an embodiment of the apparatus for forming a beverage, the nozzle includes a double walled jacket. The double walled nozzle is advantageous in that it provides intense heating of the liquid via steam through the inner nozzle while minimizing milk residue formation on the exterior nozzle surface thus allowing easy cleanability.

In accordance with an embodiment of the apparatus for forming a beverage, the double walled nozzle/jacket includes an exterior insulating jacket (typically of silicone, glass etc.) and interior conducting jacket (typically of stainless steel, aluminum, copper etc.).

In accordance with an embodiment of the apparatus for forming a beverage, the apparatus further includes a temperature sensor associated with the steam nozzle, the temperature sensor configured to sense the temperature of the liquid in the vessel and provide a sensed temperature signal indicative thereof, and a controller in signal communication with the temperature sensor to control the boiler to adjust the steam flow and alter the temperature of the liquid. The integrated temperature sensor monitors and regulates the steam output in two modes—high steam for boiling and low steam for simmering. The Steam nozzle and temperature sensor assembly is also detachable for easy cleanability In accordance with an embodiment of the apparatus for forming a beverage, the controller controls the boiler to alter the steam flow between a heating mode and a simmering mode in response to the sensed temperature of the liquid.

In accordance with an embodiment of the apparatus for forming a beverage, the apparatus further includes a heating element incorporated into the nozzle for delivering a warming heat to the liquid.

In accordance with an embodiment of the apparatus for forming a beverage, the connection assembly includes an aperture, the cartridge chamber further having a connector pin configured to engage the aperture to removably secure the beverage cartridge to the cartridge chamber.

In accordance with an embodiment of the apparatus for forming a beverage, the beverage cartridge includes a string having a first end and a second end, the first end connected to the connection assembly and the second end attached to the container assembly, such that the separator includes a blade, the blade includes a notch configured to allow the string to pass through the blade when the blade is acting upon the beverage cartridge.

In accordance with an embodiment of the apparatus for forming a beverage, the separator includes a pair of opposed blades associated with the apparatus for forming a beverage, each blade actionable on opposed sides of the frangible portion.

In accordance with an embodiment of the apparatus for forming a beverage, the output port includes a door that is openable to allow the portion containing the tea material to pass through the output port and closeable to prevent the portion from passing through the output port.

In accordance with an embodiment of the apparatus for forming a beverage, the cartridge chamber is arranged to hold the multiple beverage cartridges.

In accordance with an embodiments of the apparatus for forming a beverage, the apparatus further includes a second vessel having a larger volume than the volume of the vessel.

In accordance with an embodiment of the apparatus for forming a beverage, the liquid is milk, and the tea material is black tea.

In accordance with another aspect, there is provided a beverage cartridge adapted to form a beverage with an associated beverage forming machine having a separator for engaging the beverage cartridge to deposit the tea material into a vessel, the beverage cartridge having a connection assembly configured to be removably secured to the beverage forming machine, and a container assembly configured to house a tea material, the container assembly being connected to the connection assembly and disconnectable from the connection assembly when engaged by the separator.

In accordance with an embodiment of the beverage cartridge adapted to form a beverage with an associated beverage forming machine, there is further provided a string having a first end and a second end, the first end attached to the connection assembly and the second end attached to the container assembly.

In accordance with an embodiment of the beverage cartridge adapted to form a beverage with an associated beverage forming machine, the string is extended from a storage position and is dimensioned to suspend the container assembly from the separated connection assembly within the vessel.

In accordance with an embodiment of the beverage cartridge adapted to form a beverage with an associated beverage forming machine, the storage position includes the string raveled around the container assembly, wherein the string unravels under the force of gravity when the container assembly from the separated connection assembly.

In accordance with an embodiment of the beverage cartridge adapted to form a beverage with an associated beverage forming machine, the connection assembly includes a tab, the tab having an aperture configured to slidably engage with and disengage from a corresponding post provided on the beverage forming machine.

In accordance with an embodiment of the beverage cartridge adapted to form a beverage with an associated beverage forming machine, there is further provided a frangible portion connecting the container assembly and connection assembly.

In accordance with an embodiment of the beverage cartridge adapted to form a beverage with an associated beverage forming machine, the frangible portion includes opposed fracture recesses.

In accordance with an embodiment of the beverage cartridge adapted to form a beverage with an associated beverage forming machine, the opposed fracture recesses each comprise a v-shaped indent cross-section.

In accordance with an embodiment of the beverage cartridge adapted to form a beverage with an associated beverage forming machine, the frangible portion includes an aperture disjointing the opposed fracture recesses; and a spool for winding a portion of a string thereabout in a storage position, the string having a first end and a second end, the first end attached to the connection assembly and the second end attached to the container assembly, the spool extending into the aperture.

In accordance with an embodiment of the beverage cartridge adapted to form a beverage with an associated beverage forming machine, the frangible portion is configured to be separated by a cutter associated with the brewing machine.

In accordance with an embodiment of the beverage cartridge adapted to form a beverage with an associated beverage forming machine, the frangible portion is configured to be separated by a pair of opposed blades associated with the beverage forming machine each actionable on one of the opposed fracture recesses.

In accordance with an embodiment of the beverage cartridge adapted to form a beverage with an associated beverage forming machine, the frangible portion is configured to be separated by a differential torque applied by the separator between the connection assembly and the container assembly.

In accordance with an embodiment of the beverage cartridge adapted to form a beverage with an associated beverage forming machine, a portion of the string is stored in the container assembly, the container assembly having a string output for allowing the portion of the string to be drawn from the container assembly after the container assembly and the connection assembly have been separated.

In accordance with an embodiment of the beverage cartridge adapted to form a beverage with an associated beverage forming machine, there is further provided a retractable string connected to the connection assembly and the tea material housing, the retractable string configured to extend under the weight of the tea material housing after the connection assembly and the container assembly are separated.

In accordance with an embodiment of the beverage cartridge adapted to form a beverage with an associated beverage forming machine, the container assembly includes a permeable tea bag containing the tea material.

In accordance with an embodiment of the beverage cartridge adapted to form a beverage with an associated beverage forming machine, beverage medium includes spices.

In accordance with an embodiment of the beverage cartridge adapted to form a beverage with an associated beverage forming machine, the beverage cartridge is arranged to be received by a beverage forming machine that uses the cartridge to form the beverage.

Other features and objects of the present invention will become more apparent from the description that follows of optional embodiments thereof, having reference to the appended drawings and given as examples only as to how the invention may be put into practice.

BRIEF DESCRIPTION OF THE DRAWINGS

The present invention may be better understood with reference to the written description and drawings, of which.

DETAILED DESCRIPTION

Figure 1:
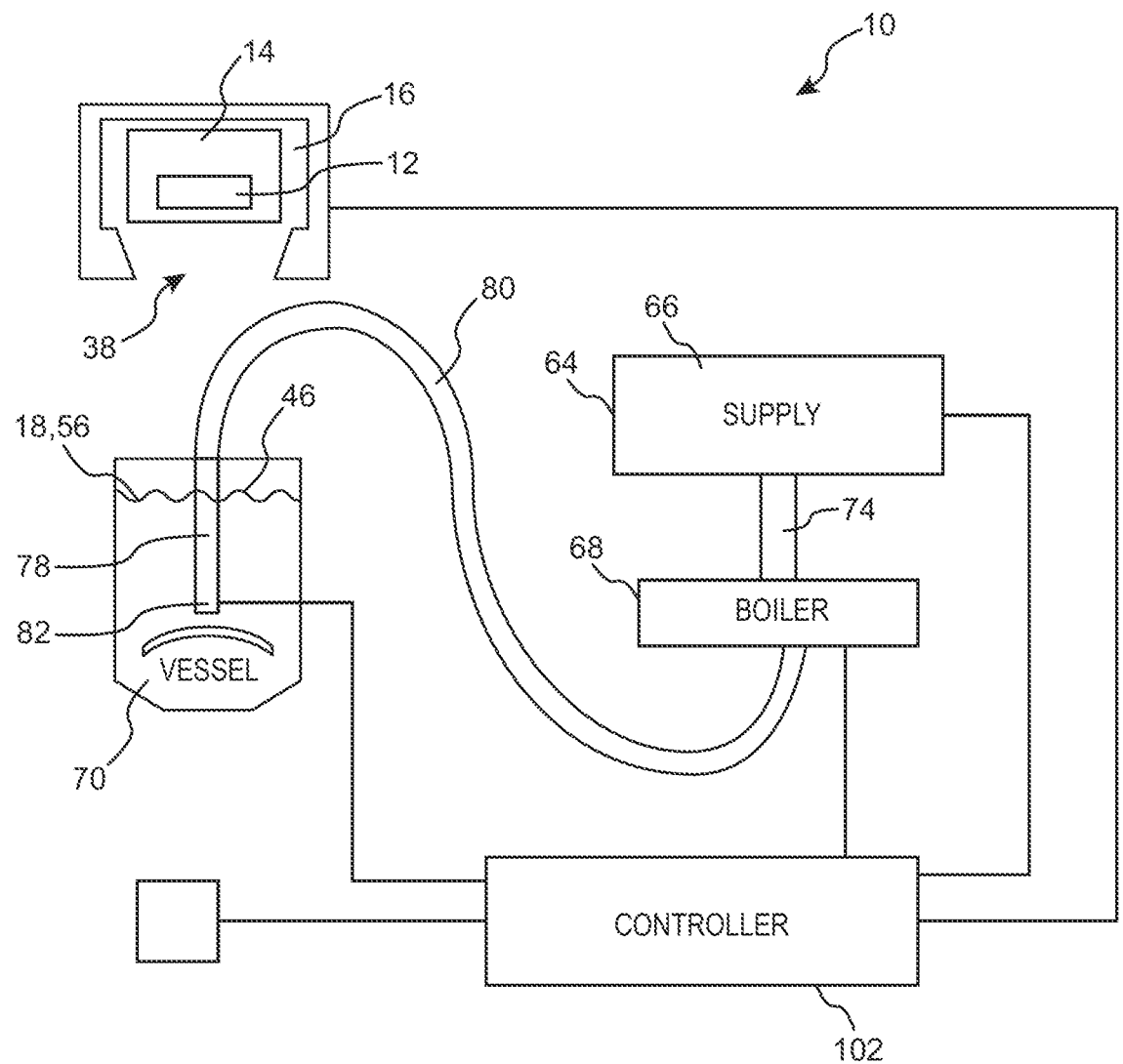
FIG. 1 is a schematic block diagram of an apparatus for forming a beverage, in accordance with an illustrative embodiment.

Embodiments of the present invention generally concern beverage forming machines that use a disposable cartridge and applications thereof. The beverage forming machine of the present invention uses steam to heat the liquid to form the beverage, and a disposable cartridge that can be employed by such a machine.

Now referring to FIG. 1-5, there is illustrated an apparatus for forming a beverage in a vessel holding a liquid using a tea material contained within a portion of a beverage cartridge. The apparatus for forming a beverage, generally referred to using the reference numeral 10, will now be illustratively described herein below.

Still referring to FIG. 1-5, the apparatus for forming a beverage 10 can be used to form a beverage such as tea, for example chai tea, coffee, or other infusion or stewing, brewing, or steeping formed beverages, which is formed using a tea material 12 contained within a portion of a tea packet/beverage cartridge 14. The tea material 12 may include illustratively tea leaf, but other precursor material such as coffee grinds, liquid concentrate or powdered concentrate, or the like, to form a hot or cold beverage, by stewing, steeping, or brewing the tea material 12 in a liquid, as may be generally used to form beverage such as tea, may be provided. For example, the tea material 12 may illustratively include black tea to form the beverage known as chai tea, but other types of tea material may also be used, including tea material 12 mixed with spices, or other types of ingredients so as to add additional flavoring to the beverage to be formed. In accordance with an embodiment of the beverage cartridge 14, the beverage material 12 includes spices. The meaning of the term "forming" refers to the process of the beverage being prepared for consumption by leaving the tea material 12 in a liquid, such as water or milk for example, to release and transfer the flavor and nutrients contained within the tea material 12 to the liquid. The term "forming" can include terms, but not limited to, other processes known in the art, such as steeping, stewing, or brewing, for example, generally known in the art of tea making, or more generally for the making of a beverage. The meaning of the term "stewing" may refer to the process of teas being prepared for drinking by leaving the tea material in heated liquid to release the flavor and nutrients within the tea leaves. The meaning of the term "steeping" may refer to the process of soaking the tea material in a liquid which can include a liquid which is initially hot or cold. A beverage may also be formed by "brewing" which may involve the continual application of heat to a liquid from an outside source while the tea material is submerged in or in contact with the liquid. These terms can be used interchangeably herein depending on the manner in which the apparatus for forming a beverage 10 is operated, but generally the preparation of the beverage will involve he process of transferring the flavors and nutrients contained in the tea material 12 to the liquid when the tea material 12 is submerged within the liquid as assisted by the application of heat to the liquid in a manner to be described herein below.

Still referring to FIGS. 1-5, the apparatus for forming a beverage 10 further illustratively includes a cartridge chamber 16 arranged to receive the beverage cartridge 14 and to deposit the portion of the beverage cartridge 14 containing the tea material 12 into a vessel 18. The apparatus for forming a beverage 10 illustratively includes a housing 20 which supports the various components of the apparatus for forming a beverage 10, including the cartridge chamber 16, and may include a frame (not shown) which may be surrounded by the housing 20, or maybe integrally formed with the housing 20, to provide support to and enclose the various components of the apparatus for forming a beverage 10. The housing 20 encloses or supports the various components typically included in a beverage machine, including a water supply, heater, fluid conduits, electronic controls, power supply and regulator, and other components which are described in more detail herein below. In the illustrated embodiment, the housing 20 is shaped as an aesthetically contoured enclosure to enclose the various components of the apparatus for forming a beverage 10. The housing 20 is illustratively defined by housing walls 22 including side and top walls, and a base 24 so as to enclose and support the components of the apparatus for forming a beverage 10. The housing 20 may also include a protruding shelf 26 arranged to support the vessel 18 relative to the housing 20 or to add stability to the housing 20 when placed upon a surface. The shelf 26 may also act to catch any liquid or spills from the vessel 18. The shelf 26 illustratively forms part of the base 24, and may assist with supporting the housing 20 and supporting the vessel 18 which may be placed thereupon during a beverage formation operation. In addition, an overhang 28 forming part of the housing 20 is also provided which illustratively projects over the shelf 26. The housing 20, the housing walls 22, the frame (not shown), the base 24, and the shelf 26, can be formed of or include plastics or metals, for example plastic shaped through a plastic injection molding method, or other types or combinations of metals and plastic like aluminum, copper or brass, or stainless steel.

The apparatus for forming a beverage 10 may be dimensioned so as to form a counter-top appliance sized apparatus, such as a similarly shaped coffee-machine, or may also be sized as a larger beverage dispensing unit which may be dimensioned to be placed on the floor next to vending machines or scaled to accommodate larger production and retail applications, for example coffee shop environments. However, although the illustrated examples of the apparatus for forming a beverage 10 relate to a counter-top appliance dimensioned apparatus, it will be readily understood that the apparatus for forming a beverage 10 according to other embodiments may alternatively be used in formats, shapes and sizes of other types. Additional examples of structures in which the apparatus for forming a beverage 10 may be embodied include those capable of accommodating spaces such as on shelves, cabinets, or the like.

Figure 2A:
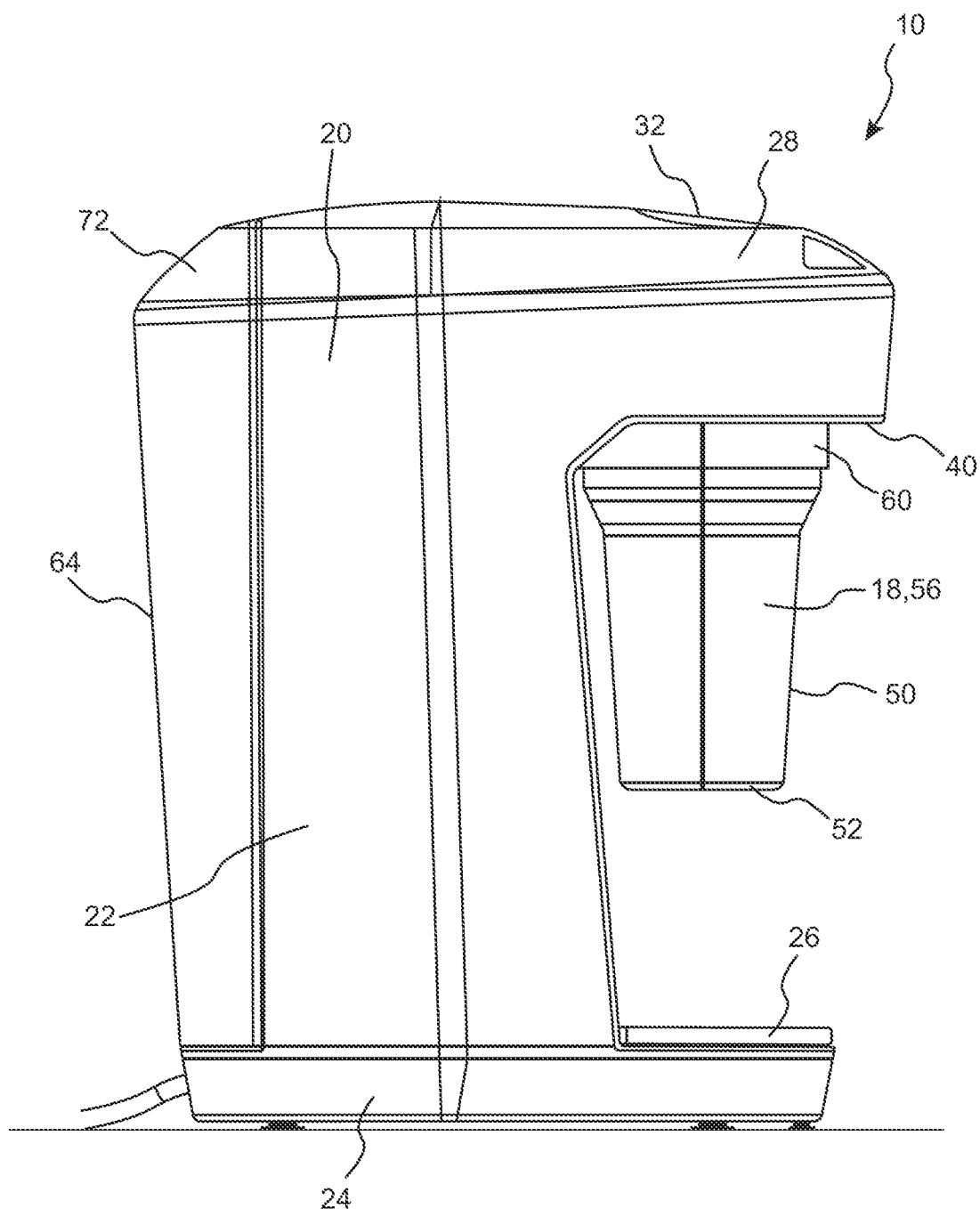
FIG. 2A is a side view of an apparatus for forming a beverage, in accordance with an illustrative embodiment.
Figure 2B:
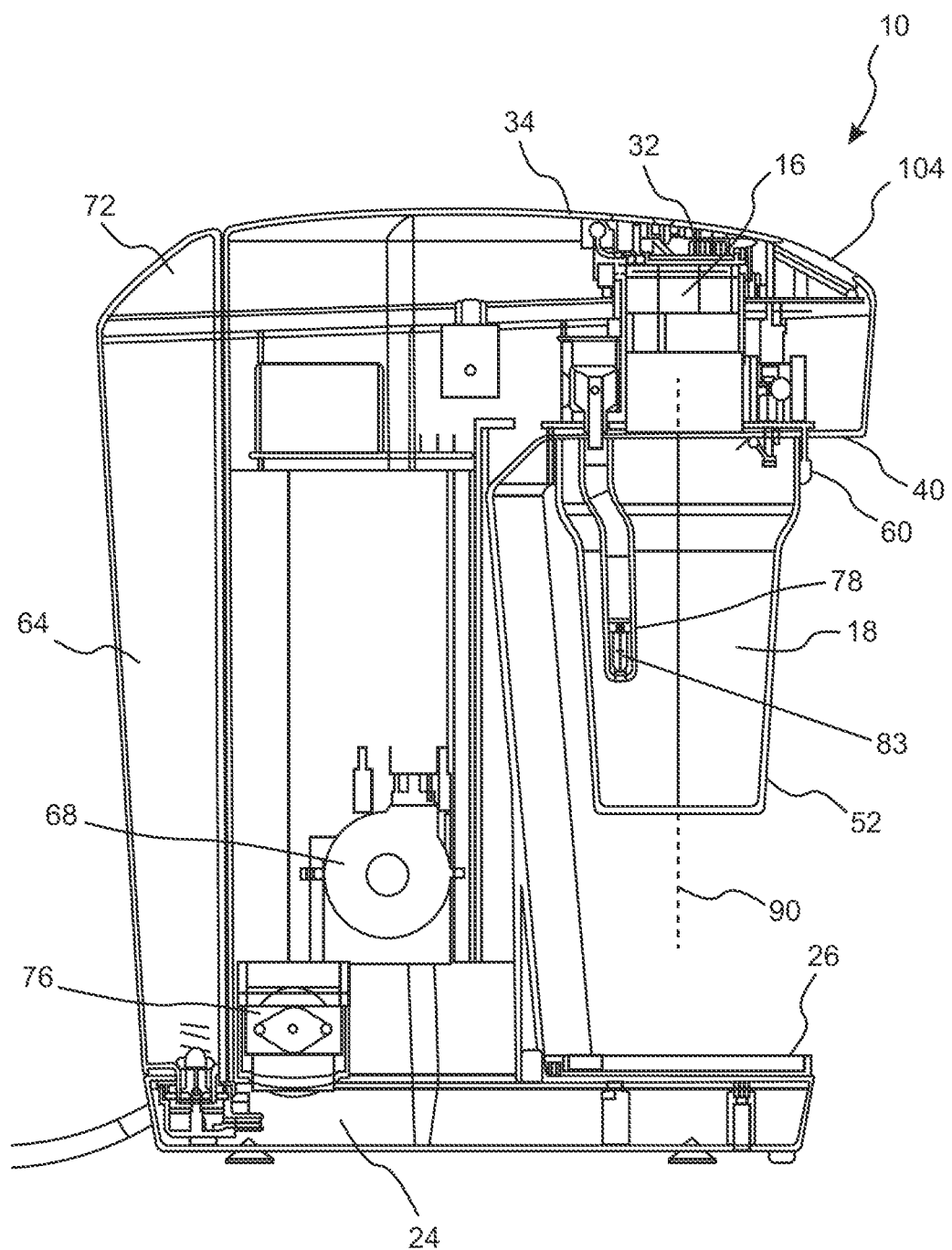
FIG. 2B is a cross-sectional side view of an apparatus for forming a beverage, in accordance with an illustrative embodiment.
Figure 3A:
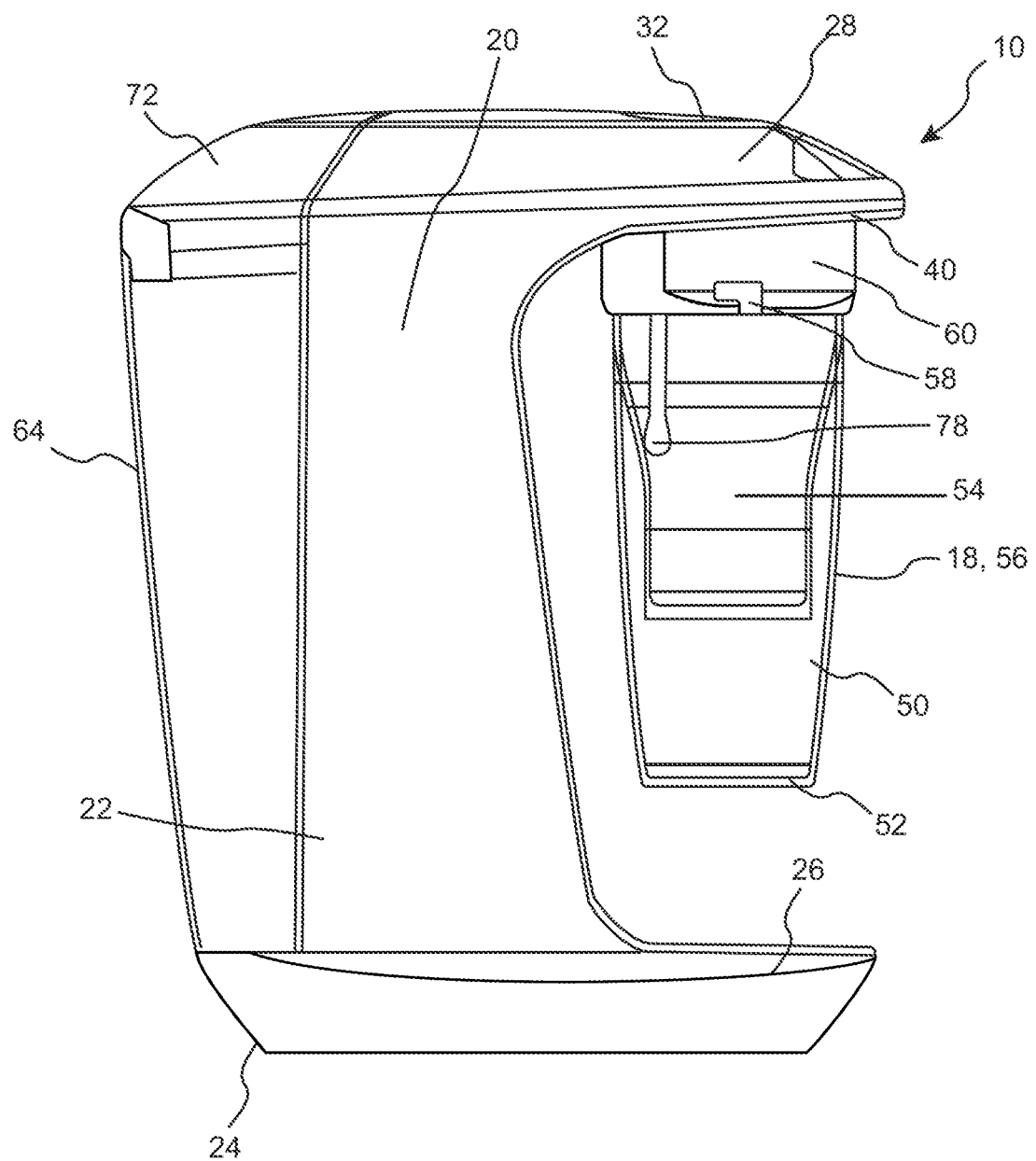
FIG. 3A is a side view of an apparatus for forming a beverage in accordance with an illustrative embodiment.
Figure 3B:
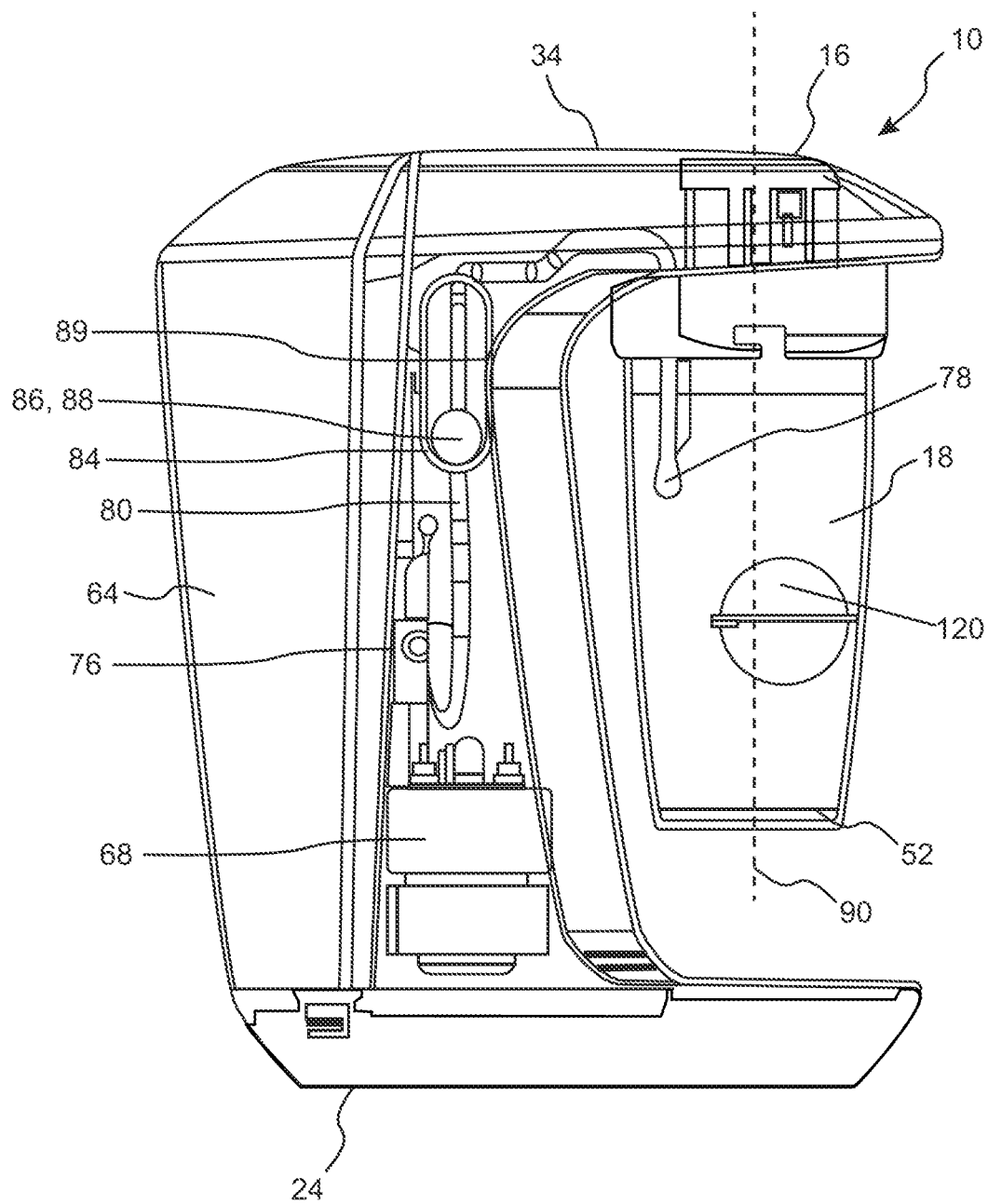
FIG. 3B is a side semi-transparent view of an apparatus for forming a beverage in accordance with FIG. 3A.
Figure 4A:
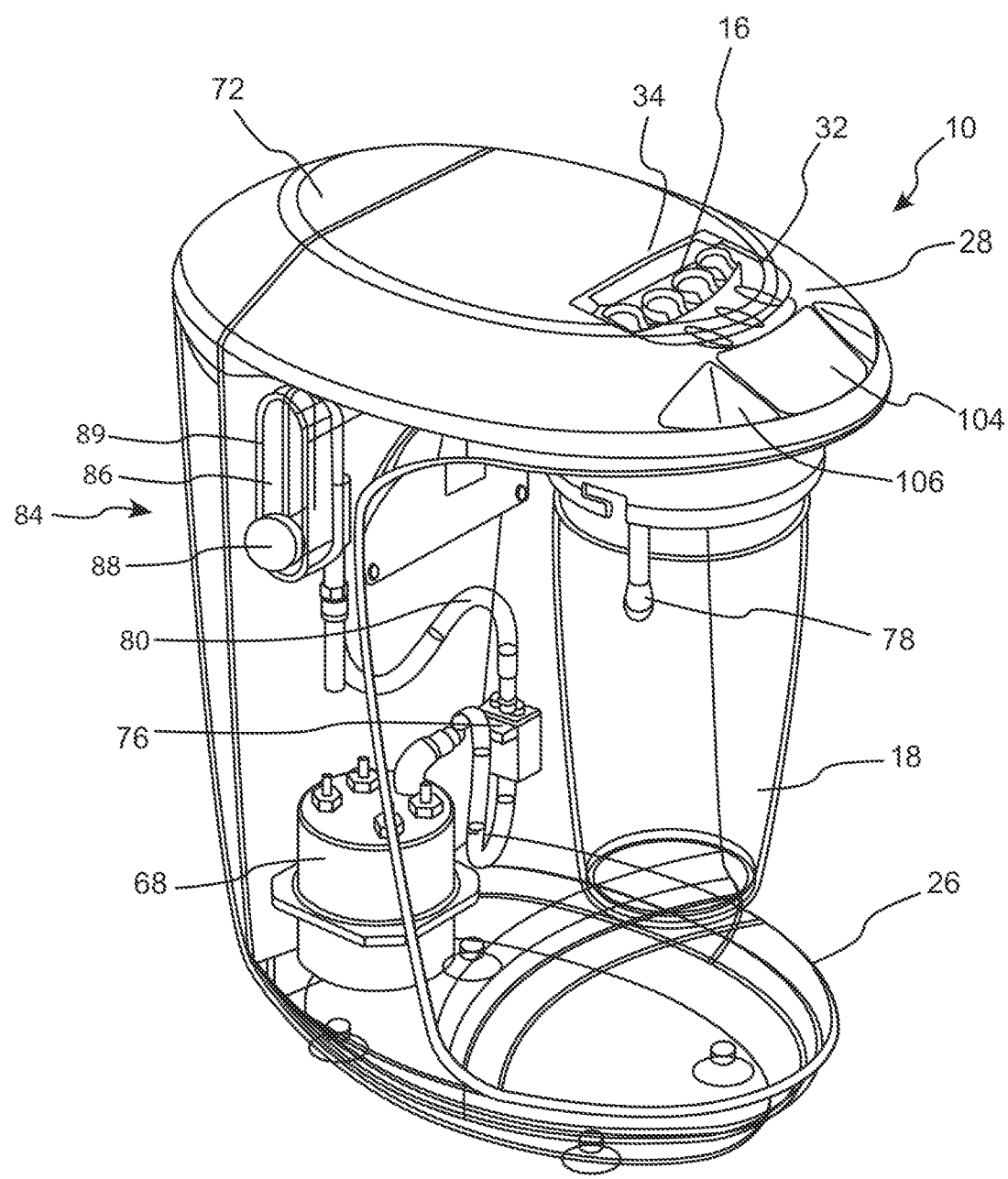
FIG. 4A is a top perspective semi-transparent view of the apparatus for forming a beverage of FIGS. 3A-B.
Figure 4B:
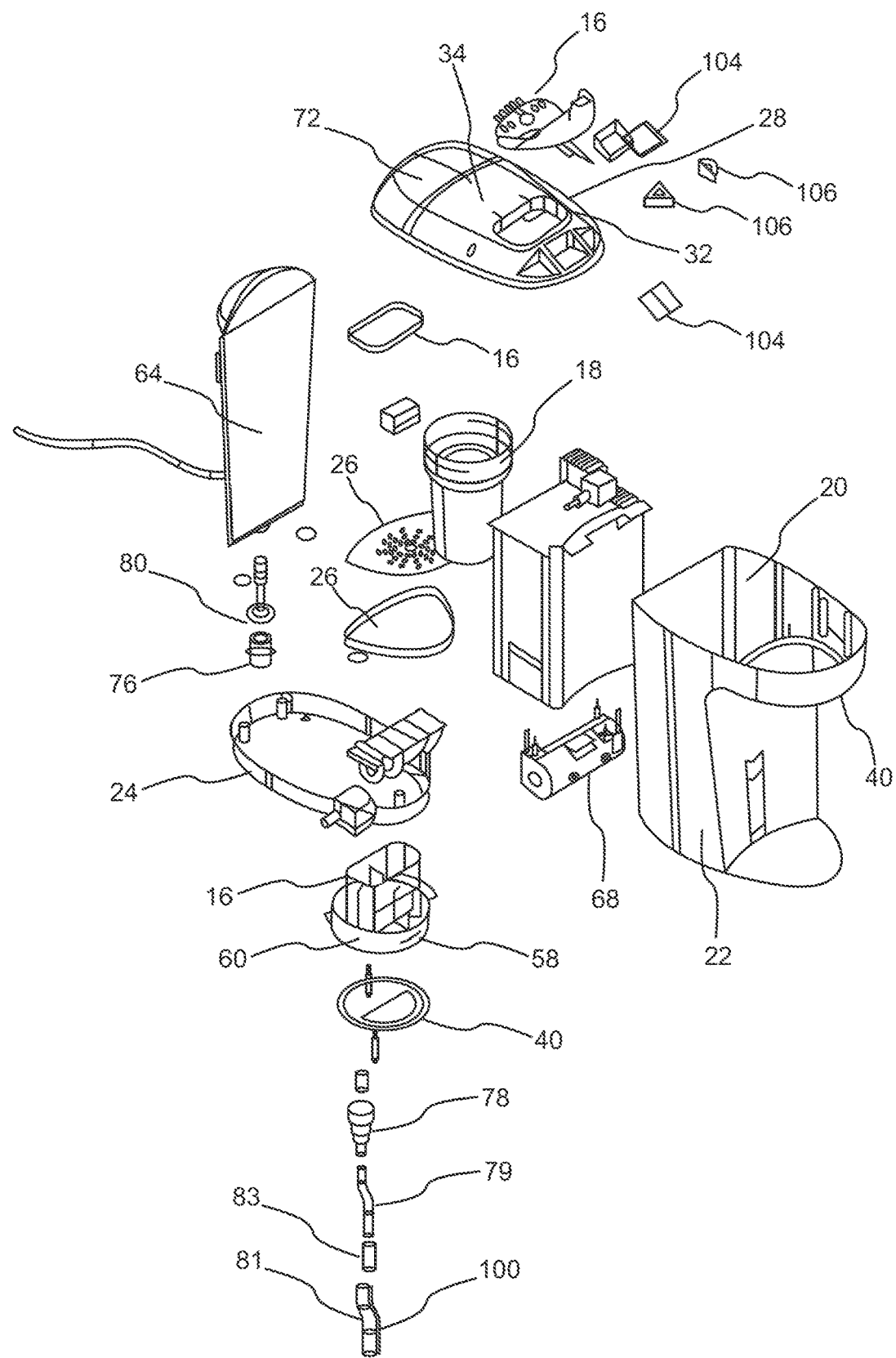
FIG. 4B is a perspective exploded view of the apparatus for forming a beverage of FIGS. 2A-B.
Figure 5:
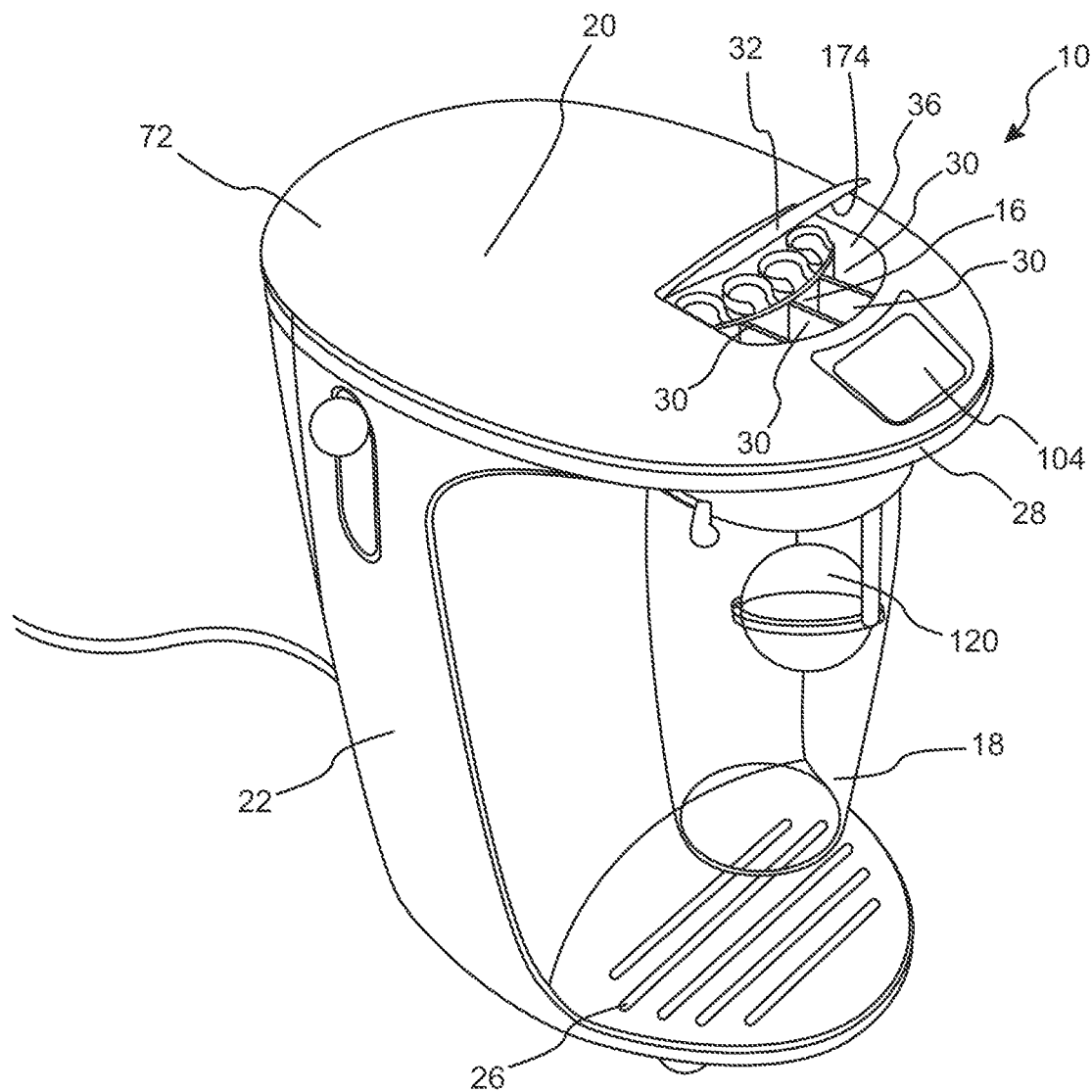
FIG. 5 is a top perspective view of the apparatus for forming a beverage of FIGS. 3A-B.

Now referring to FIGS. 4A-B and FIG. 5, in addition to FIG. 1 and FIGS. 2A-B and 3A-B, in accordance with an embodiment, the cartridge chamber 16 is illustratively provided in the overhang 28 and is suitably shaped in a rectangular space defined within the overhang 28 so that the beverage cartridge 14 may be placed therein by a user for example. In accordance with an embodiment, the cartridge chamber 16 is arranged to hold multiple beverage cartridges 14. For example, the cartridge chamber 16 may be a suitably shaped volume to further accommodate multiple beverage cartridges 14, the cartridge chamber 16 being further illustratively subdivided into four cartridge sub-chambers 30 configured to each receive a beverage cartridge 14. Such an arrangement may simplify use of the apparatus for forming a beverage 10, particularly where the cartridge portions are arranged for only a single use, e.g., formation of a single volume of beverage and discarded thereafter, or for multiple single uses, or for cases where a stronger beverage or a beverage with more volume is desired to be formed, which necessitates the use of multiple cartridges 14 during a beverage forming cycle.

Still referring to FIGS. 1-5, the cartridge chamber 16 arranged to receive the beverage cartridge 14 is illustratively supported by and integrally formed with the housing 20. In the illustrated embodiment, the cartridge chamber 16 includes a chamber lid 32 illustratively provided on an upperside 34 of the overhang 28. The chamber lid 32 may be manually or automatically lifted to provide entry of the beverage cartridge 14 into the cartridge chamber 16 via a chamber input port 36. Both the cartridge chamber 16 and chamber input port 36 may be dimensioned to accommodate the dimensions of the beverage cartridge 14 or multiple beverage cartridges as in 14. The chamber lid 32 is illustratively pivotally mounted to the housing 20 to allow it to be raised or lowered between an open position to allow access to the cartridge chamber 16 for insertion and removal of a beverage cartridge 14, or lowered to close the cartridge chamber 16 and to enclose the beverage cartridge 14 during a beverage forming operation. When the chamber lid 32 is closed it may cooperate with the housing 20 to partially or fully enclose a beverage cartridge 14 during the brew operation since the brewing of the beverage occurs in the vessel. Optionally, in the case where the beverage is formed in an interim volume, other than the vessel 18 which may be for example a volume within the cartridge chamber 16, the chamber lid 32 may be closed so as to prevent liquid or the beverage from exiting the top of the apparatus for forming a beverage 10 via the chamber input port 36. Of note, while the chamber lid 32 has been illustrated to pivotally open and close relative to the housing 20, the cartridge chamber 16 may be opened and closed in any suitable manner to allow one or more beverage cartridges as in 14 to be placed in and removed from the cartridge chamber 16. Additionally, while the chamber lid 32 is illustratively provided on the upperside 34 of the overhang 28, it may be provided on the sides or at other locations on the overhang 28, or otherwise.

After the beverage cartridge 14 has been received by the beverage chamber 16, the chamber lid 32 may be moved in a manual or automatic manner to thereby enclose the beverage cartridge 14 within the cartridge chamber 16. Alternatively, the closing of the chamber lid 32 may at least partially enclose the beverage cartridge 14 within the cartridge chamber 16. Of note, while the beverage cartridge 14 is illustrated to be received by a chamber input port 36 provided on the upperside 34 of the overhang 28, the chamber input port 36 may be provided in any other suitable position or configuration to allow a beverage cartridge 14 to be received into the cartridge chamber 16, for example via a side input port (not shown) provided on the overhang 28, or via an automatic feed mechanism (also not shown) operating within the overhang 28 as enclosed by the housing 20.

Figure 7:
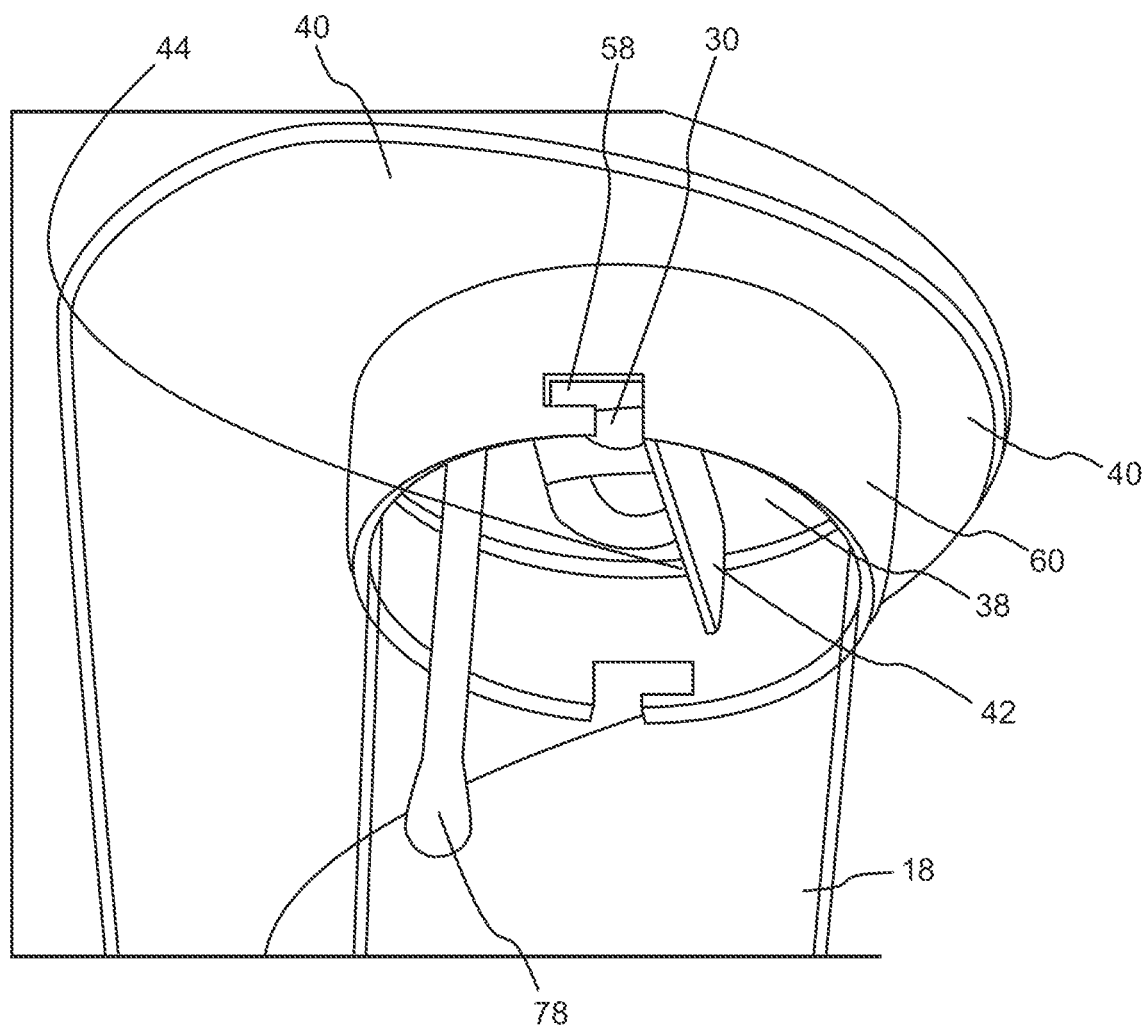
FIG. 7 is a side perspective close-up view of the apparatus for forming a beverage of FIG. 2, illustrating an open trap door in accordance with an illustrative embodiment.
Figure 8:
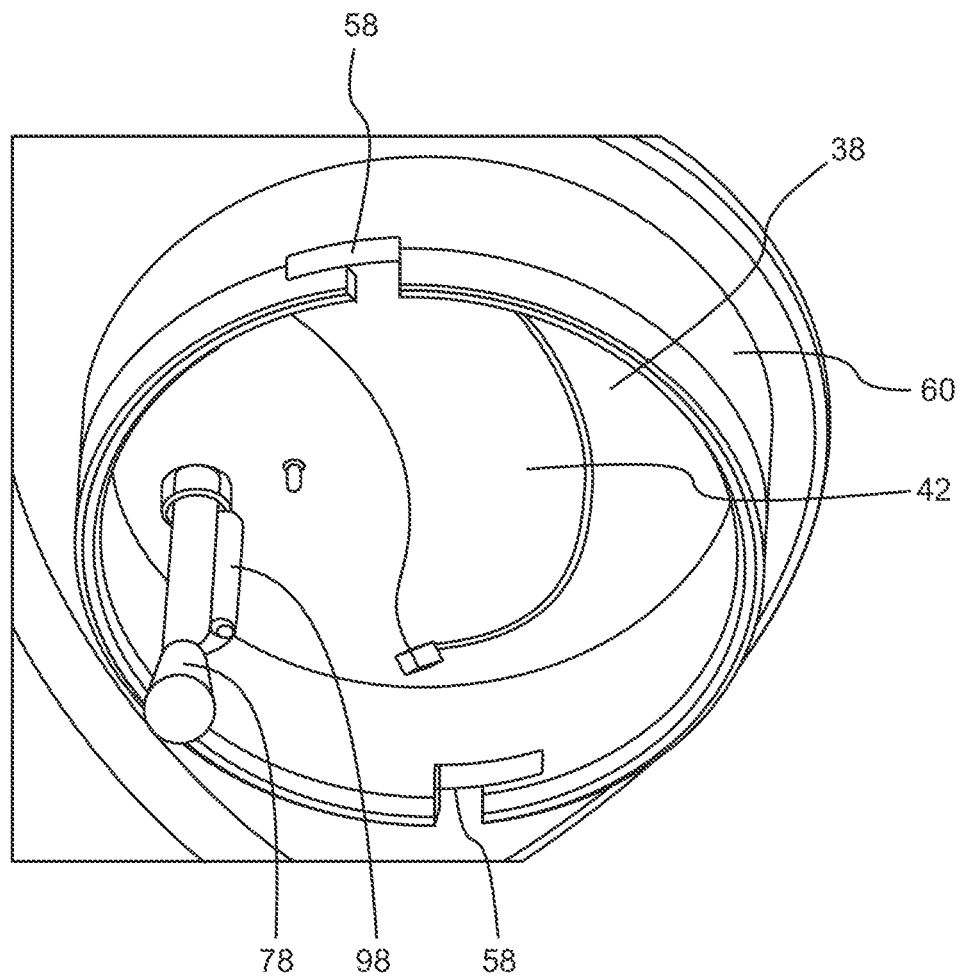
FIG. 8 is a side perspective close-up view of the apparatus for forming a beverage of FIG. 2, illustrating a closed trap door in accordance with an illustrative embodiment.

Now referring to FIG. 7 and FIG. 8, in addition to FIGS. 1-5, the cartridge chamber 16 is illustratively further arranged to deposit the portion of the beverage cartridge 14 containing the tea material 12 into the vessel 18. In accordance with the illustrative embodiment, the cartridge chamber 16 includes a chamber output port 38 positioned on the underside 40 of the overhang 28 and in communication with the cartridge chamber 16. The cartridge chamber 16 is arranged to deposit the portion of the beverage cartridge 14 containing the tea material 12 into the vessel 18, for example under the force of gravity via the chamber output port 38. The chamber output port 38 is illustratively formed as an opening provided on the underside 40 of the overhang 28 so as to allow the portion of the beverage cartridge 14 containing the tea material 12 to be ejected from the cartridge chamber 16 and towards the vessel 18. The term "deposit" may be understood as referring to the placement of the portion of the beverage cartridge 14 containing the tea material 12 as ejected or guided from the cartridge chamber 16 and into the vessel 18. As illustrated herein, the portion of the beverage cartridge 14 containing the tea material 12 is deposited by being ejected from the cartridge chamber 16 under the force of gravity as guided by the chamber output port 38 and there onto into the vessel 18 which is illustratively positioned beneath the cartridge chamber 16. The arrangement of the cartridge chamber 16 to deposit the portion of the beverage cartridge 14 containing the tea material 12 need not be done under the force of gravity but may also be deposited under some other force acting on the portion of the beverage cartridge 14 containing the tea material 12, for example using some mechanized means, spring action, or in another manner. Of note, while the cartridge chamber 16 is illustratively arranged to deposit the portion of the beverage cartridge 14 containing the tea material 12 into the vessel 18, the cartridge chamber 16 may be arranged to deposit only the tea material 12 into the vessel 18, with the beverage cartridge 14 remaining within the cartridge chamber 16.

Still referring to FIG. 7 and FIG. 8, in accordance with an alternate embodiment of the apparatus for forming a beverage 10, the chamber output port 38 may include a door 42 that is openable to allow the portion of the beverage cartridge 14 containing the tea material 12 to pass through the chamber output port 38, and closeable to prevent the portion of the beverage cartridge 14 containing the tea material 12 from passing through the chamber output port 38. In accordance with an embodiment, the door 42 is illustratively pivotally mounted to the underside 40 of the overhang 28 to allow it to transition, or in the illustration to swing, between an open position to allow the portion of the beverage cartridge 14 containing the tea material 12 to be ejected from the cartridge chamber 16 and deposited into the vessel 18, or closed to prevent the portion of the beverage cartridge 14 containing the tea material 12 from being ejected from the cartridge chamber 16 and deposited into the vessel 18. In accordance with an embodiment, the portion of the beverage cartridge 14 containing the tea material 12 may rest upon the door 42 before being opened. The door 42 illustratively includes a door surface 44 upon which the portion of the beverage cartridge 14 containing the tea material 12 may rest prior to the door 42 opening. In accordance with another embodiment, the door 42 may be controlled to open to deposit of the portion of the beverage cartridge 14 containing the tea material 12 into the vessel 18 upon meeting certain operating conditions, for example the door 42 may be opened after the liquid in the vessel 18 has reached an optimal beverage forming temperature, as will be further described herein below. In such a case, the portion of the beverage cartridge 14 containing the tea material 12 will be resting upon the door surface 44 and the opening of the door 42 will allow the portion of the beverage cartridge 14 containing the tea material 12 to be deposited in the vessel 18 under the force of gravity for example. While the door 42 has been illustrated as a trap door or a flap, other types of door configurations, such as a sliding door may also be provided, so as to be able to intercept the portion of the beverage cartridge 14 containing the tea material 12 and maintain it in a temporary storage position before it is deposited in the vessel 18.

Figure 9:
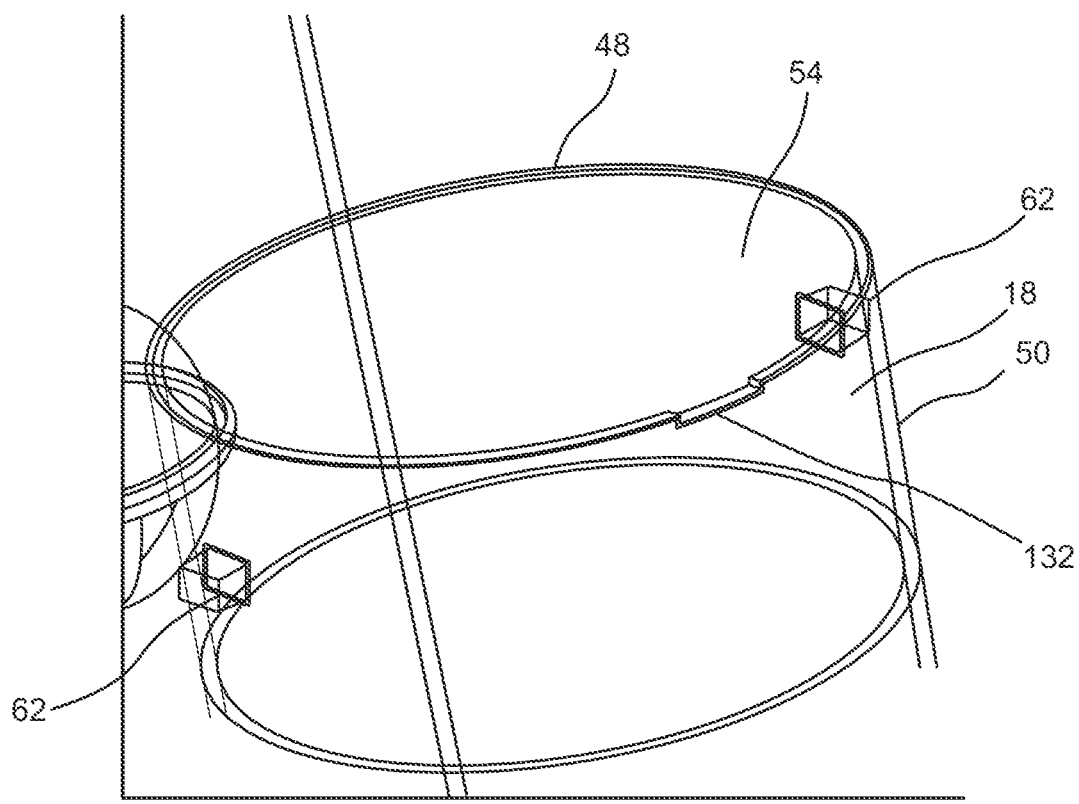
FIG. 9 is a top perspective close-up view of a vessel, in accordance with an illustrative embodiment.

Now referring to FIG. 9. in addition to FIG. 1, FIGS. 2A-B, FIGS. 3A-B, and FIG. 7, the portion of the beverage cartridge 14 containing the tea material 12 is deposited into the vessel 18 after being ejected from the cartridge chamber 16. The vessel 18 may be a cup or other suitable receptacle that is illustratively placed beneath the overhang 28 and the chamber output port 38 so that when the portion of the beverage cartridge 14 containing the tea material 12 is ejected from the cartridge chamber 16 via the chamber output port 38, it is received by the vessel 18 to be deposited therein. The vessel 18 is configured to hold a liquid 46, such as milk, or other type of liquid, during the formation of the beverage in a manner as described herein below. The term "vessel" may be understood as referring to a hollow container, especially one used to hold a liquid. The vessel may also be configured to be removed from beneath the overhang 28 and used as a cup so that a user may directly drink the beverage from the cup. As illustrated herein, the vessel 18 is a cup including a lip 48, a cylindrically shaped cup wall 50, a bottom 52, and an internal space 54 defined thereby. The vessel 18 may also be an insulated cup, a mug or other type of container to hold the beverage once formed. Illustratively, the vessel 18 is a cup formed from a transparent plastic, but it may be formed from other materials, such as stainless steel or the like.

Still referring to FIG. 1, FIGS. 2A-B, FIGS. 3A-B, and FIG. 7, in accordance with an alternate embodiment, the apparatus for forming a beverage 10 may include a second vessel 56 having a larger volume than the volume of the first vessel 18. The housing 20 of the apparatus for forming a beverage 10 may be appropriately dimensioned so as to accommodate both the vessel 18 and the second vessel 56 between the overhang 28 and the shelf 26 of the housing 20 and the housing 20 may be adapted to allow the vessel 18 and the second vessel 56 to be interchangeably placed beneath the overhang 28 and chamber output port 38. Providing such differently sized vessels with different internal volumes may offer a user with the option of forming a beverage of different volumes using the apparatus for forming a beverage 10. For example, the smaller sized vessel 18 may be used with the apparatus for forming a beverage 10 operated with a single beverage cartridge 14, while the larger sized second vessel 56 may be used with the apparatus for forming a beverage 10 operated with multiple beverage cartridges 14.

Still referring to FIG. 1, FIGS. 2A-B, FIGS. 3A-B, FIG. 7, and FIG. 9, in accordance with an embodiment, the vessel 18 is positionable adjacent to the cartridge chamber 16 to receive the portion of the beverage cartridge 14 containing the tea material 12 from the cartridge chamber 16. In the illustrated figures, the vessel 18 is positioned below cartridge chamber 16 and below the overhang 28. In accordance with another embodiment of the apparatus for forming a beverage 10, cartridge chamber 16 and the vessel 18 are juxtaposed, the cartridge chamber 16 further including the chamber output port 38 juxtaposed to the opening defined by the lip 48 of the vessel 18 and arranged to direct the portion of the beverage cartridge 14 containing the tea material 12 into the internal space 54 of the vessel 18. For example, the lip 48 may be positioned adjacent to the chamber output port 38. While the configuration where the vessel 18 is positioned below cartridge chamber 16 allows for the portion of the beverage cartridge 14 containing the tea material 12 to be deposited in the vessel 18 under the force of gravity, other configurations which allow the portion of the beverage cartridge 14 containing the tea material 12 to be deposited in the vessel 18 may be provided, for example, the output chamber port 38 may be configured to direct the portion of the beverage cartridge 14 containing the tea material 12 from a side of the overhang 28 where the vessel 18 may be positioned side-by-side, or next to, the apparatus for forming a beverage 10.

Now referring to FIG. 8, in addition to FIG. 7 and FIG. 9, in accordance with an embodiment of the apparatus for forming a beverage 10, the housing 20 and the vessel 18 are removably connectable. The meaning of the term "removably connectable" refers to the capability of the vessel 18 to be connected to and disconnected from the housing 20. In the illustrated figures, the chamber output port 38 includes a cylindrically shaped extension which projects from the overhang 28 towards the shelf 26, and includes locking notch 58 formed within the wall of the cylindrically shaped extension so as to form a chamber port interface 60 extending downwardly from the underside 40 of the overhang 28. The vessel 18 further includes protruding latches 62 outwardly protruding from the lip 48. Alternatively, the latches 62 may extend from the cup wall 50. The chamber port interface 60 is dimensioned slightly larger than the diameter of the lip 48 and a portion of the cup wall 50 such that the lip 48 can be received within the chamber port interface 60 and the locking notch 58 and the protruding latches 62 can engage to lock through a twisting action of the vessel 18 when the lip 48 is received within the port interface 60 to thereby removably connect the vessel 18 to the housing 20. When removably connected, the vessel 18 is positioned adjacent to the cartridge chamber 16 such that the vessel 18 is able to receive the beverage cartridge 14 containing the tea material 12 from the cartridge chamber 16, illustratively under the force of gravity, and as passed through the lip 48 and into the internal space 54 of the vessel 18. The locking notch 58 may be illustratively stepped so that the vessel 18 can be locked into place with the chamber port interface 60 by a twisting action, but removed with a combination of vertical and twisting actions. While the vessel 18 is illustrated as being removably connectable to the housing 20 by a twisting action, other removable connections may be made, for example by a snap or other fitted connection for example by providing mating threads (not shown) on the internal surface of the chamber port interface 60 and on the cup wall 50 of the vessel 18, so that the vessel 18 is removably connectable to the housing 20.

Referring back to FIGS. 1-4B, the apparatus for forming a beverage 10 further includes a reservoir 64 for holding a supply of water 66, and a boiler 68 in fluid communication with the reservoir 64, the boiler 68 configured to generate steam 70 from the water 66 supplied from the reservoir 64, which may be collectively referred to herein as the water supply system. The reservoir 64 illustratively includes a reservoir lid 72 that engages with the reservoir 64 to form a sealed enclosure. Although a user may initially provide the water 66 in the reservoir 64, for example by pouring, the apparatus for forming a beverage 10 may be configured such that water 66 is supplied to the reservoir 64 or supplied directly to the boiler 68 in another manner other than manually filling of the reservoir 64, for example by way of a plumbed water line, or via a second water reservoir or other tank (both not shown) that is fluidly connected to the reservoir 64, or still other arrangements.

The water 66, or other type of liquid, supplied from the reservoir 64 may be provided to the boiler 68 via a water supply line 74 which are fluidly coupled. The water supply line 74 may be illustratively formed from a hollow plastic, metallic, or braided conduit, piping or the like. The boiler 68 may include heating elements (not shown) to heat the water 66 to a sufficient temperature such that the supplied water 66 is converted into steam 70. The water supply system formed from these elements may also include a pump 76 illustratively provided downstream from the boiler 68 to increase the output pressure of the steam 70 to be supplied to the vessel 18. Other components, such as pressure regulators, safety valves, control valves, a compressor, pressure sensors, which may be provided to form part of a water supply system (all not shown) may also be employed to assist with an appropriate delivery of steam 70 into the vessel 18.

Now referring to FIGS. 6A-D, in addition to FIGS. 1-4B, the apparatus for forming a beverage 10 further includes a nozzle 78 in fluid communication with the boiler 68, the nozzle 78 configured to inject the steam 70 into the vessel 18 to heat the liquid 46 causing the received tea material 12 which has been deposited, or will be deposited, into the vessel 18 to infuse the liquid 46 and form the beverage within the vessel 18. The nozzle 78 is illustratively in fluid communication with the boiler 68 via a steam supply line 80, which may be illustratively formed from a hollow plastic, metallic, or braided conduit, piping or the like. The nozzle 78 is illustratively arranged to extend into the internal space 54 of the vessel 18 to deliver the steam 70 into the vessel 18 below the surface of the liquid 46. In the illustrated embodiment, the nozzle 78 extends downwardly from the underside 40 of the overhang 28 and into the vessel 18. In accordance with an embodiment, the nozzle 78 includes a nozzle output 82 configured to output the steam 70.

Figure 6A:
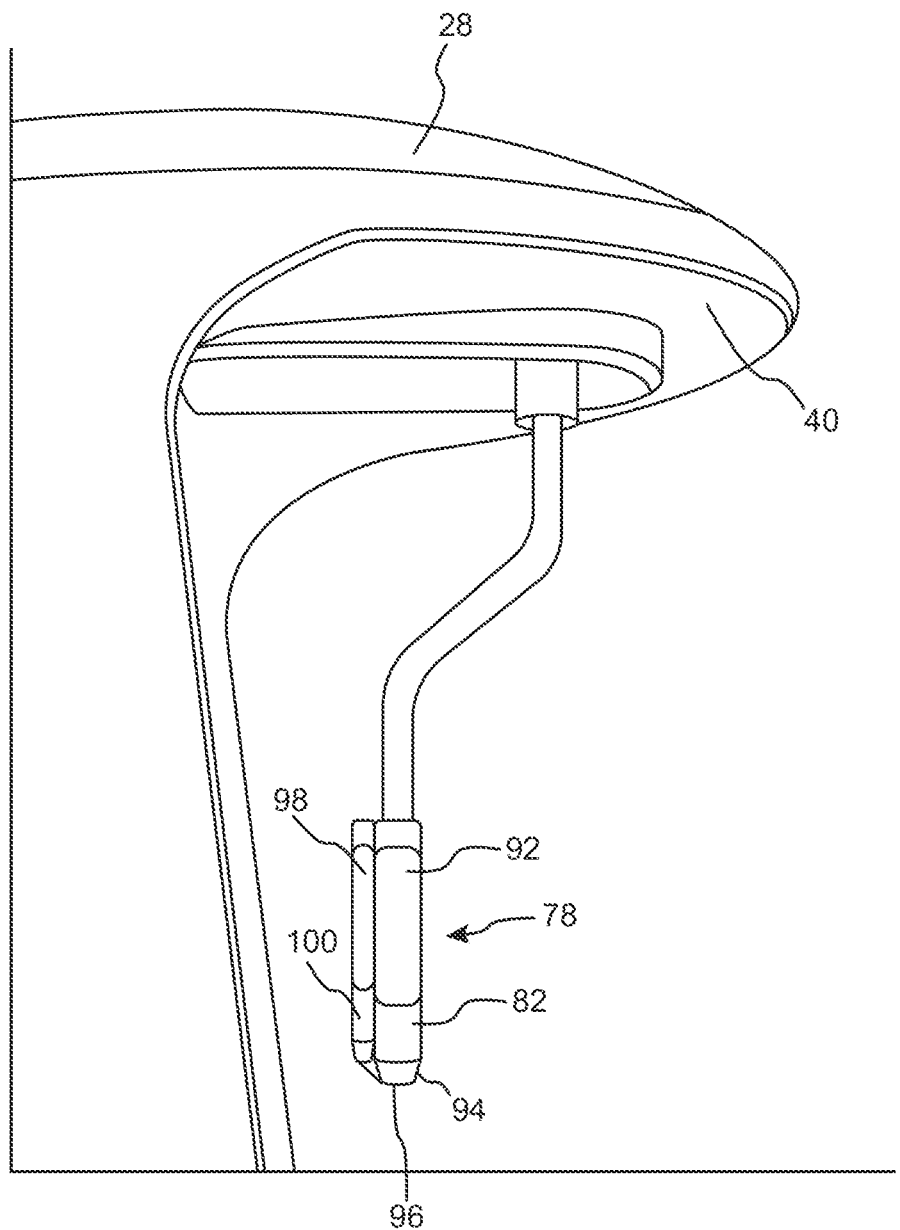
FIG. 6A is a partial side view of the apparatus for forming a beverage of FIG. 2, illustrating a double-walled steam nozzle in accordance with an illustrative embodiment.
Figure 6B:
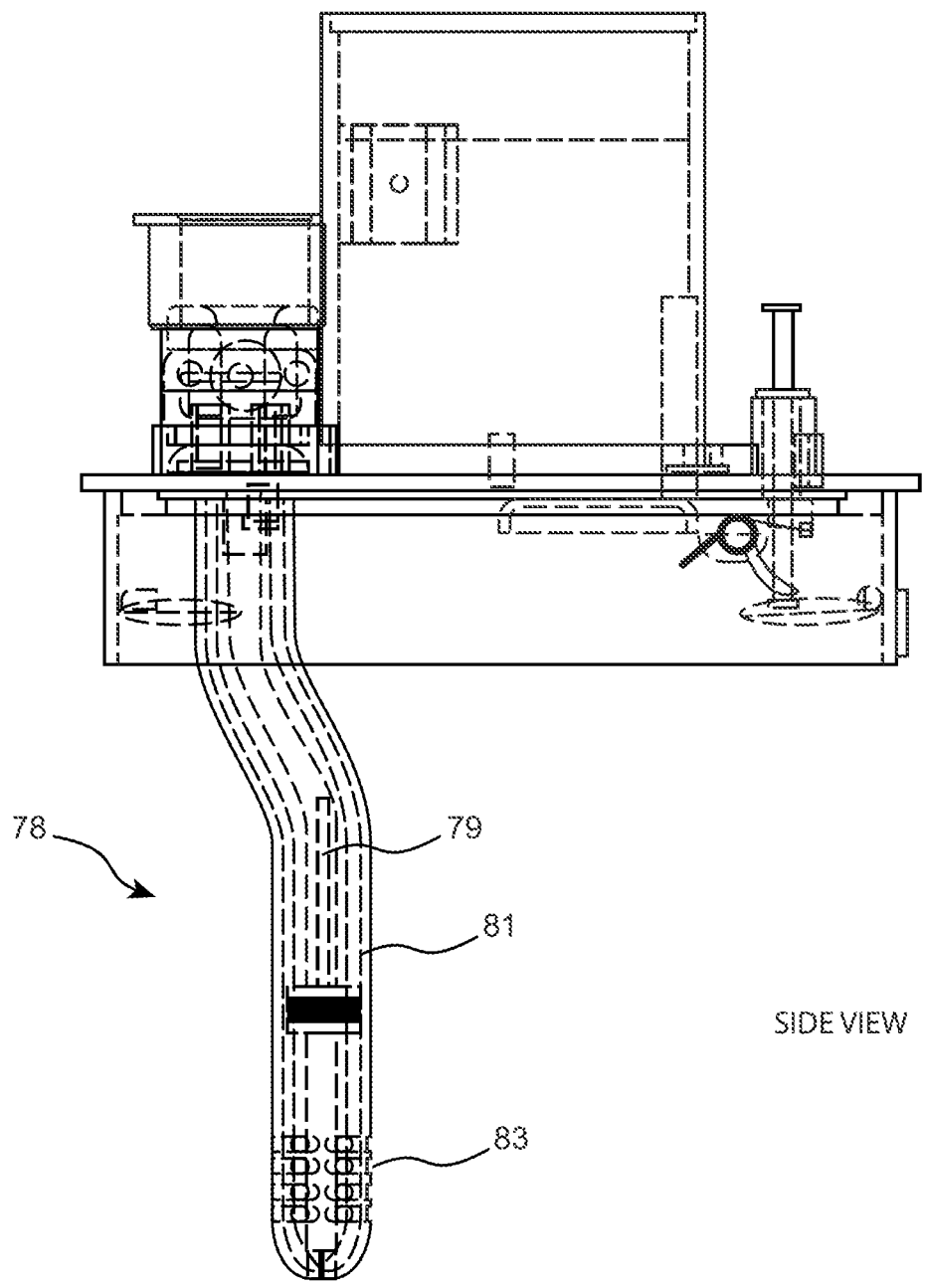
FIG. 6B is a partial side view of the apparatus for forming a beverage of FIGS. 2A-B, illustrating a double-walled steam nozzle in accordance with an illustrative embodiment.
Figure 6C:
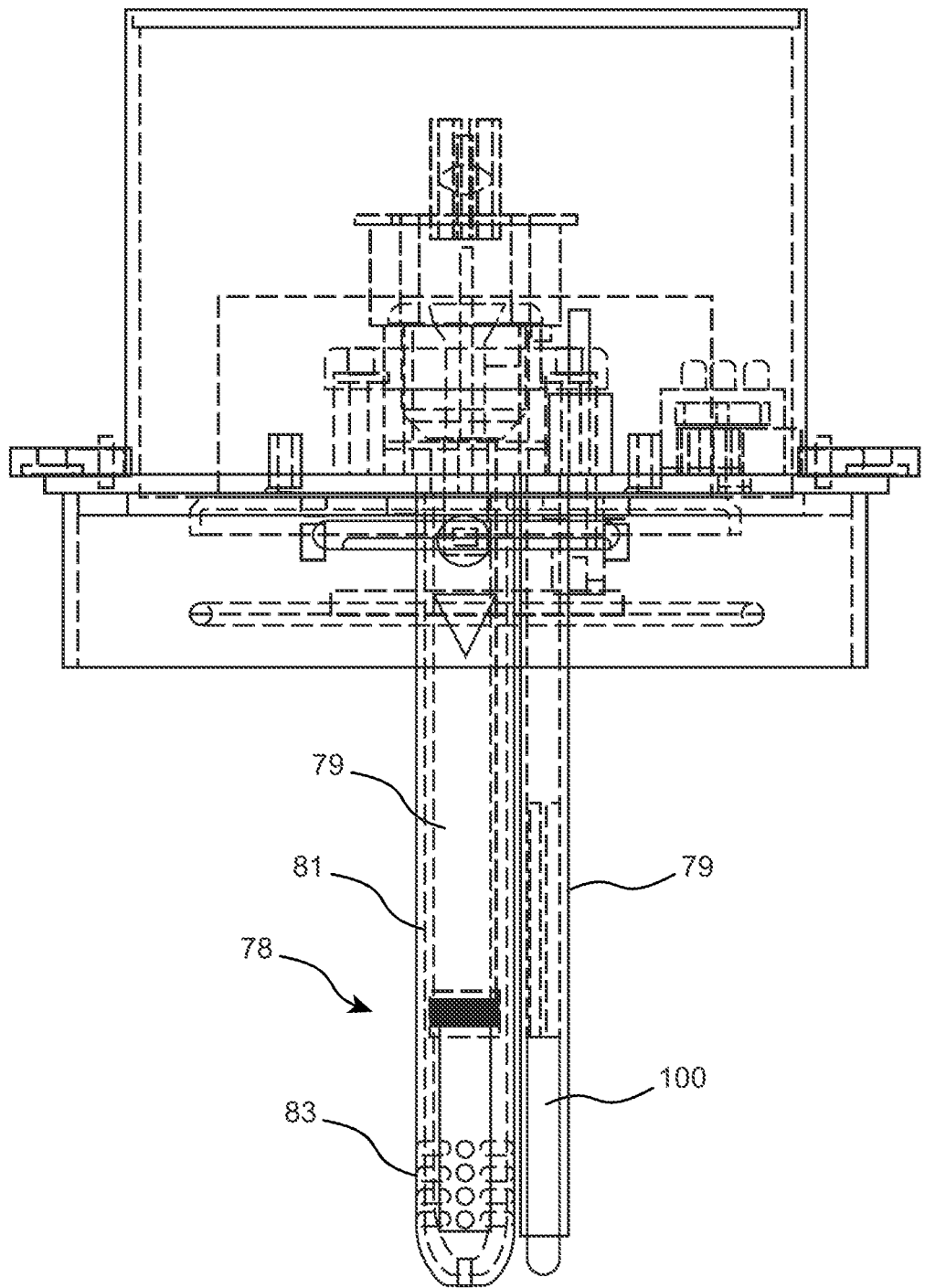
FIG. 6C is a partial front view of the apparatus for forming a beverage of FIGS. 2A-B, illustrating a double-walled steam nozzle in accordance with an illustrative embodiment.
Figure 6D:
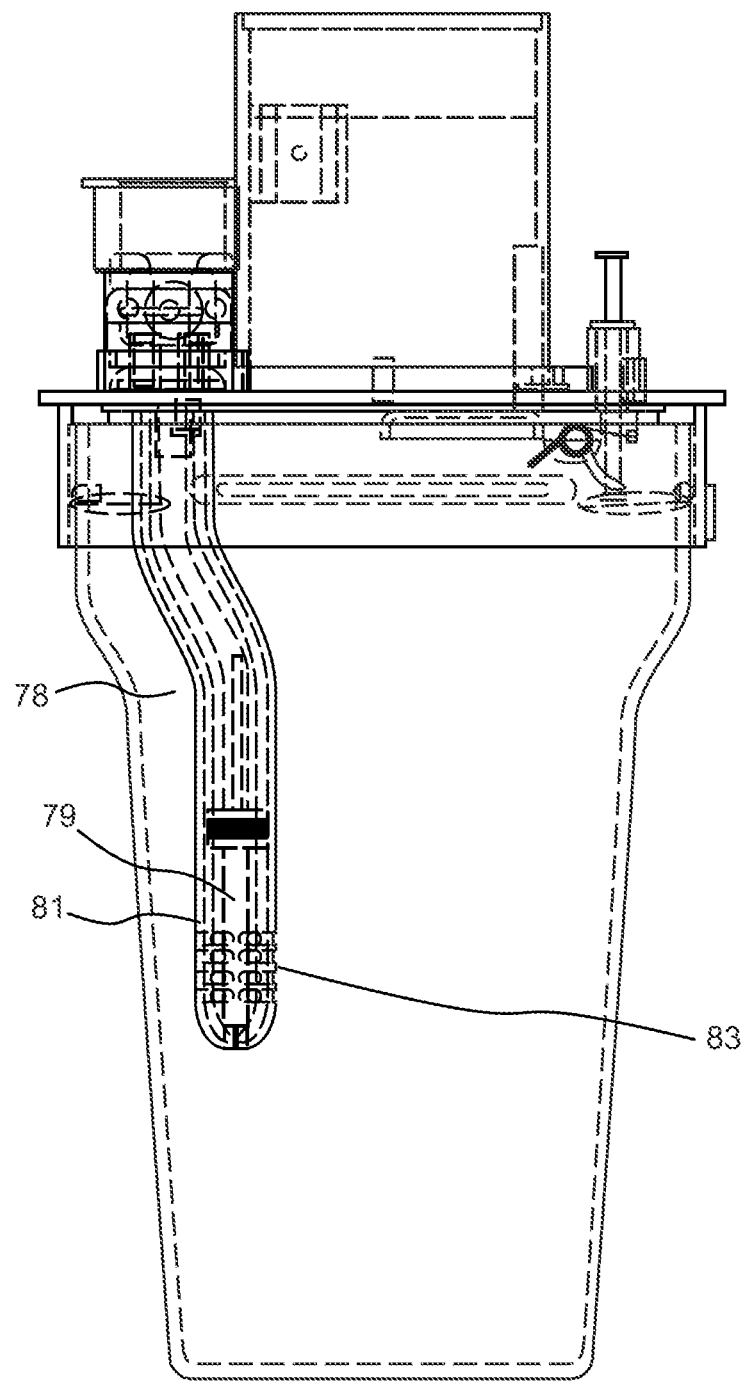
FIG. 6D is a partial side view of the apparatus for forming a beverage of FIGS. 2A-B, illustrating a vessel and steam nozzle in accordance with an illustrative embodiment.

As best seen in FIGS. 6B-D, nozzle 78 is configured with a double-wall such that steam is delivered via an interior conduit 79 to heat the liquid, while an exterior nozzle surface 81 is not in contact with the steam. This configuration prevents the nozzle exterior surface 81 from reaching the higher steam temperatures, which would otherwise lead to deposits of milk or other liquid components on exterior surface 81 and that would cause difficulty in cleaning. Also, best seen in FIG. 6A, temperature sensor 100, is integrated with the steam nozzle but also insulated from the interior conduit 79 for accurate readings of the liquid temperature. The complete integrated assembly of the nozzle and sensor is detachable for easy cleanability. The steam nozzle 78 has steam output as a set of radial apertures 83 that are defined by interior conduit 79. Steam nozzle 78 may be angled and apertures 83 may be configured to contribute to an agitating, swirling, or other liquid mixing effect.

Now referring to FIGS. 3A-B, in addition to FIG. 1 and FIGS. 2A-B, in accordance with an embodiment, the nozzle 78 is movable towards and away from the housing 20 and correspondingly towards and away from the bottom 52 of the vessel 18 when the vessel 18 is positioned adjacent to the cartridge chamber 16. The apparatus for forming a beverage 10 may further include an actuator 84 configured to move the nozzle 78 within the internal space 54 of the vessel 18. In the illustrated embodiment, the actuator 84 is provided as a lever assembly 86 including a lever handle 88 extending from within the housing 20 through a slot 89 formed in the housing wall 22 to provide a track along which the lever handle 88 can move to impart a corresponding movement upon the nozzle 78 when the lever handle 88 is moved by a user to extend or retract the nozzle 78 within the internal space 54 of the vessel 18. The lever assembly 86 may include a type of linkage to impart a movement on the steam supply line 80, but other mechanisms to impart a movement upon the nozzle 78 may be provided, including an automated mechanism using gearing and servo combinations (not shown), either mechanically or electrically operated.

Now referring to FIGS. 6A-D, in addition to FIGS. 1-3B, in accordance with an alternate embodiment of the apparatus for forming a beverage 10, the nozzle 78 includes a nozzle output 82 angled relative to the longitudinal axis 90 of the vessel 18 when the vessel 18 is positioned adjacent to the cartridge chamber 16 to direct steam 70 and agitate the liquid 46 to form a circular vortex in the liquid 46. For example, the nozzle output 82 may positioned to direct steam 70 in the internal space 54 of the vessel 18 so as to cause a spiral or other flow pattern, or to cause turbulence in the liquid 46 to assist in mixing and heating of the liquid 46 for example.

Still referring to FIG. 1 and FIGS. 6A-D, in accordance with an alternate embodiment of the apparatus for forming a beverage 10, the nozzle 78 includes a double walled jacket 92. Such a double walled jacket 92 insulates the transfer of heat from the steam 70 contacting the interior surface of the nozzle 78 to the exterior surface of the nozzle 78 to maintain the temperature of the nozzle 78 at a level so as to not overheat the liquid 46 coming into contact with the exterior surface of the nozzle 78 and cause the formation of a film thereon. Such heating of the exterior surface of the nozzle 78 may cause a residue formation upon the nozzle 78, for example if the liquid 46 is milk, which may require that the nozzle 78 be cleaned after the liquid 46 has been heated and the beverage has been formed. Providing such a double walled jacket 92 may prevent or reduce such formation of residue on the exterior surface of the nozzle 78 thus avoiding the cleaning of the nozzle 78, or making the cleaning of the nozzle 78 an easier task. In an embodiment, the double walled jacket 92 includes an exterior silicone jacket 94 and an interior stainless-steel jacket 96.

In accordance with an alternate embodiment of the apparatus for forming a beverage 10, a heating element 98 incorporated with the nozzle 78 for delivering a warming heat to the liquid 46 may be provided. The term "warming heat" may refer to a heat transferred to the liquid 46 so as to maintain the liquid 46 at a temperature that assists with the infusion of the tea material 12 and the liquid 46. The heating element 98 may be an electric coil, cooper coil, or like heating element, and may be activated before or after the liquid 46 has been heated by the steam 70. In the illustrated embodiment, the heating element 98 is provided adjacent to a portion of the nozzle 78 to be submerged below the liquid 46 contained within the vessel 18.

Now referring back to FIG. 1 and FIGS. 4A-B, in addition to FIG. 6, in accordance with an alternate embodiment of the apparatus for forming a beverage 10, there may further be provided a temperature sensor 100 associated with the nozzle 78, the temperature sensor 100 configured to sense the temperature of the liquid 46 in the vessel 18 and provide a sensed temperature signal indicative thereof to a controller 102 which will now be described.

Still referring to FIG. 1, FIGS. 4A-B, and FIGS. 6A-D, the apparatus for forming a beverage 10 may further include a controller 102 in signal communication with the temperature sensor 100 to control the boiler 68 to adjust the steam flow and the amount of time to allow steam 70 to be injected into the vessel 18 to alter the temperature of the liquid 46 and also dilute the liquid 46 with the steam 70. The amount of dilution of the liquid 46, for example in the case the liquid 46 is milk, will be proportional to the amount of steam 70 injected into the vessel 18 so as to dilute the liquid 46, such as milk, with a percentage of water derived from the steam 70. The steam 70, which condenses to water when it enters into contact with the cooler liquid 46, may alter the taste and consistency of the beverage. The operation of the boiler 68 and other components of the apparatus for forming a beverage 10 may be controlled by the controller 102, which may illustratively include a programmed microcontroller and data processing electronics and power supplies along with suitable software or other software code, as well as data storage memories, communication links and cabling, switches, sensors, or other components (all not shown) which may be necessary for the operation of the apparatus for forming a beverage 10. A suitable power supply (not shown) may also be provided to power the controller 102 and other electronics, servos, switches, relays and the like, as well as the boiler 68, which may be used for the operation of the apparatus for forming a beverage 10.

In accordance with an embodiment, the controller 102 controls the boiler 68 to alter the steam flow between a heating mode and a simmering mode in response to the sensed temperature of the liquid 46. The term "heating mode" is used to refer to the operation of the boiler 68, for example an operation which produces a high rate of steam generation, in order that the steam 70 injected into the vessel 18 is sufficient to bring up the temperature of the liquid 46 in the vessel 18 to a sufficient point to form the beverage. The term "simmering mode" is used to refer to the operation of the boiler 68, for example an operation which produces a lower rate of steam generation, in order that the steam 70 injected into the vessel 18 is sufficient to maintain the temperature of the liquid 46 in the vessel 18 to a sufficient point to form the beverage, for example when the tea material 12 is being steeped in the liquid 46.

Still referring to FIG. 1 and FIGS. 4A-B, the apparatus for forming a beverage 10 may include a user interface 104 and buttons 106 provided on the upperside 34 of the overhang 28 that the user may operate to control various features of apparatus for forming a beverage 10. The user interface 104 and buttons 106 are illustratively functionally connected to the controller 102.

Figure 10A:
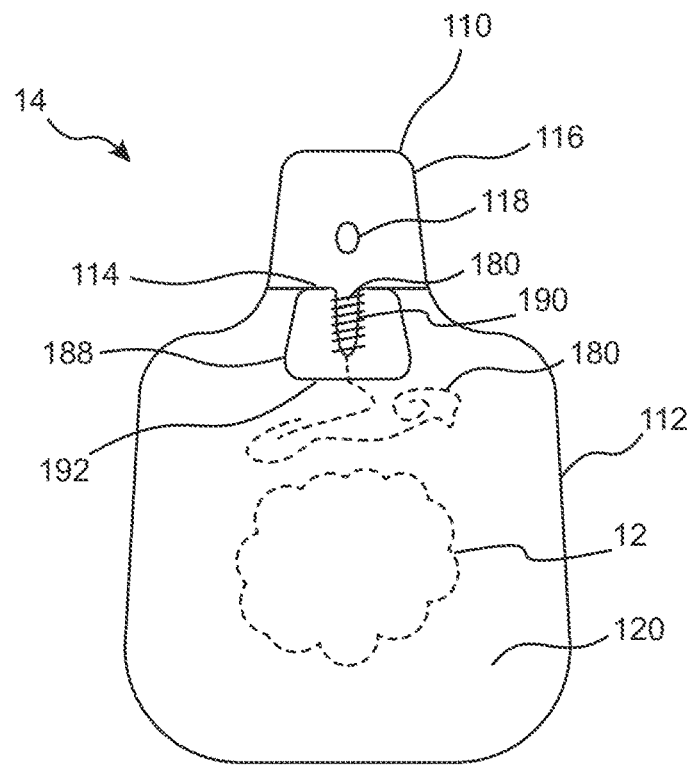
FIG. 10A is a front view of a beverage cartridge, in accordance with an illustrative embodiment.
Figure 10B:
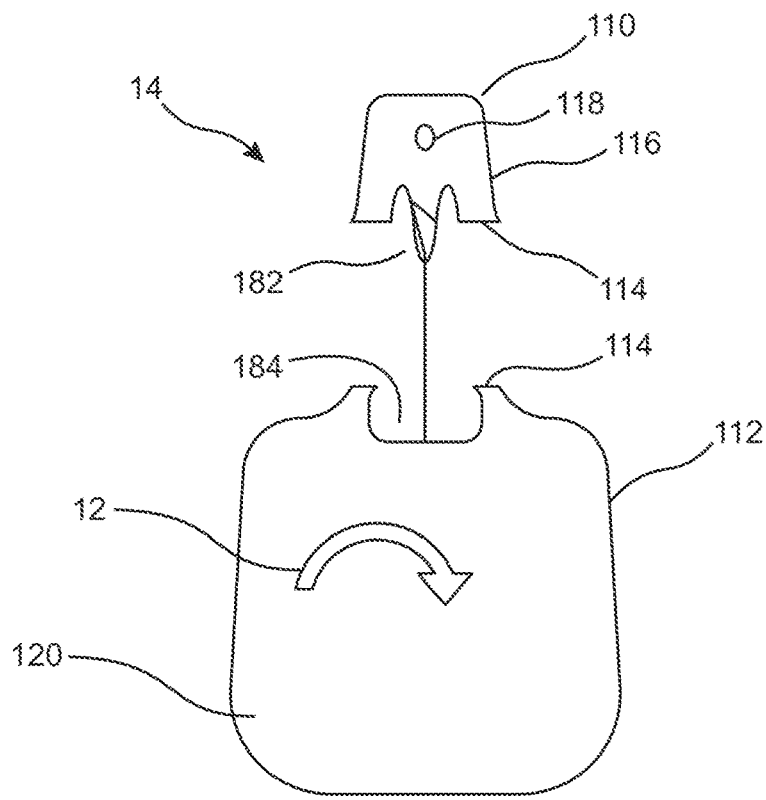
FIG. 10B is a front view of a separated beverage cartridge of FIG. 10A, in accordance with an illustrative embodiment.

Now referring to FIG. 10A and FIG. 10B, in addition to FIG. 1, in accordance with an illustrative embodiment, there is provided a beverage cartridge 14. The beverage cartridge 14 includes a connection assembly 110 configured to be removably securable to the apparatus for forming a beverage 10, a container assembly 112 configured to house the tea material 12, and a frangible portion 114 connecting the container assembly 112 and connection assembly 110, the frangible portion 114 being frangible to separate the container assembly 112 from the connection assembly 110. In accordance with an embodiment, the frangible portion 114 is frangible in response to the closing of the cartridge chamber 16 to separate the container assembly 112 from the connection assembly 110. The term "frangible" is used to mean breakable, so that for example the container assembly 112 and the connection assembly 110 may be separated from one another by an application of a force to the frangible portion 114. The container assembly 112, the frangible portion 114, and the connection assembly 110 may be made of a relatively frangible material, such as plastic or the like. That is, the frangible portion 114 may be made from a material that is sufficiently breakable or fracturable upon an application of a force thereto in a manner that will be described herein below. Other configurations as possible, for example the container assembly 112 and the connection assembly 110 may be mechanically connected and separable upon application of a force.

Still referring back to FIG. 1, FIG. 4, in addition to FIGS. 10A and 10B, the connection assembly 110 is illustratively configured to engage with and supported by the cartridge chamber 16 during the beverage forming cycle. The connection assembly includes a tab 116. The tab 116 includes an aperture 118 extending through the tab 116. Illustratively the tab 116 is formed as a flat planar element, but other configurations may be used, for example the tab 116 may be formed in the shape of a lobe, or a sphere, or otherwise a hook configuration. The tab 116 may be made of a relatively flexible or rigid material or otherwise constructed from a material such as plastic, or cellulose or other type of such material, and may be integrally formed with the frangible portion 114.

The container assembly 112 further illustratively includes a container 120 which contains the tea material 12. The container 120 is illustrated as having a rectangular shape but the container 120 may take any other type of suitable form and be sized to accommodate a suitable amount of tea material 12. The container 120 may be formed from layers of filter elements, such as a paper material, configured to surround the tea material 12 to ensure no tea material 12 is dispersed within the liquid 46 when submersed therein while allowing the liquid 46 to permeate and enter into contact with the tea material 12. Other types of forms of the container 120 such as a capsule, package, sachet or the like, supported by a frame or not, may be provided and which are liquid permeable. In an embodiment, the container 120 may include an impermeable external layer (not shown) which will prevent air and/or liquid from entering into contact with the tea material 12, for example during a storage of the beverage cartridge, in order to preserve the freshness of the tea material 12 before a beverage forming cycle. Such an impermeable external layer may be pierceable, tearable, removable, or the like to allow the tea material 12 to be exposed to the liquid 46 during a beverage forming cycle. For example, the impermeable external layer may be pierceable, tearable, removable in response to a closing of the chamber lid 32. Alternatively, the container 120 could be soluble when exposed to a liquid. In an embodiment, the container 120 may also include sub-containers (not shown) containing different types of materials. The container 120 may contain, in addition to or in replacement of the tea material 12, any suitable beverage making materials such as concentrated syrups, ground coffee or liquid coffee extract, tea leaves, dry herbal tea, powdered beverage concentrate, dried fruit extract or powder, natural and/or artificial flavors or colors, acids, aromas, viscosity modifiers, clouding agents, antioxidants, powdered or liquid concentrated bouillon or other soup, powdered or liquid medicinal materials (such as powdered vitamins, minerals, bioactive ingredients, drugs or other pharmaceuticals, nutraceuticals, etc.), powdered or liquid milk or other creamers, sweeteners, thickeners, and so on.

Figure 17:
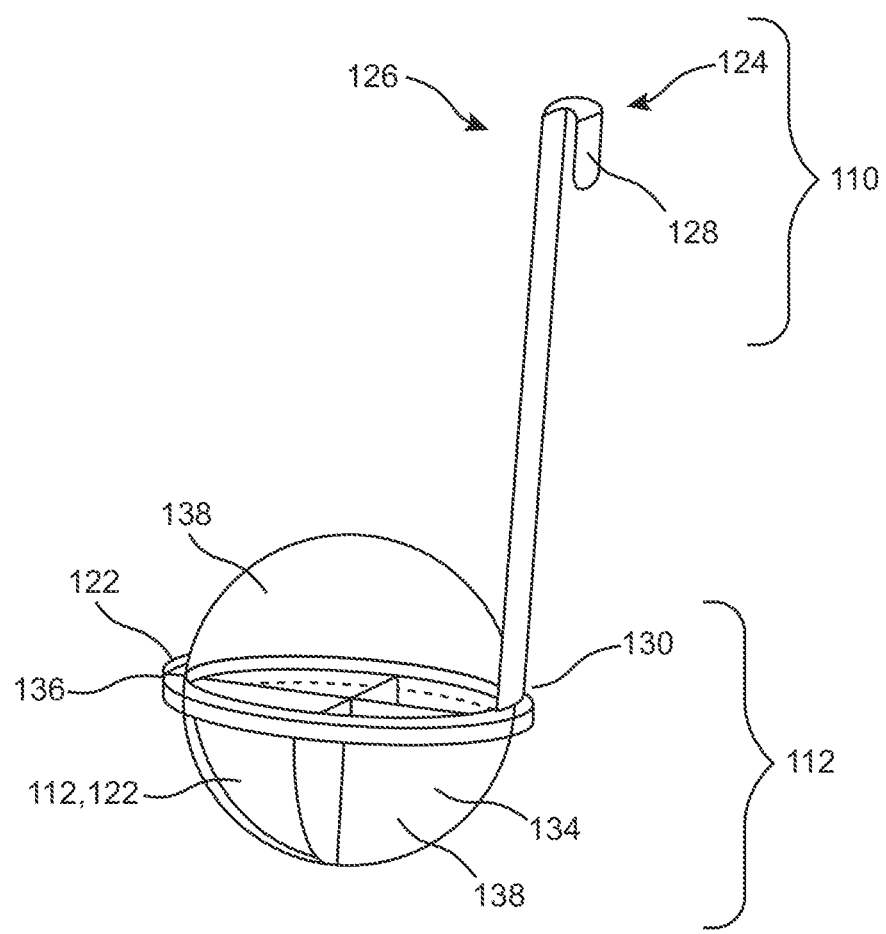
FIG. 17 is a perspective view of a sustainable mesh pod, in accordance with an illustrative embodiment.

Now referring to FIG. 17, in addition to FIGS. 3A-B, FIG. 5, and FIG. 9, in accordance with an embodiment, a sustainable mesh pod is illustrated. Forming part of the sustainable mesh pod, the container assembly 112 includes a permeable housing 122 configured to house the tea material 12, and a handle 124. The handle 124 illustratively includes a first end 126 including a hook 128 configured to engage the lip 48 of the vessel 18, or cup, to support the permeable housing 122 within the internal space 54 of the vessel 18, or cup, at a predetermined distance from the lip 48, and a second end 130 in connection with the permeable housing 122. Illustratively, the hook 128 may be sized to rest securely in a notch 132 provided on the lip 48 to provide movement constraint of the container assembly 112 when suspended within the vessel 18. The permeable housing 122 is thus able to be suspended within the internal space 54 of the vessel 18 so that tea material 12 contained in the permeable housing 122 may enter into contact with the liquid 46 held in the vessel 18. In an embodiment, suspending the container assembly 112 within the internal space 54 of the cup, or vessel 18, includes supporting the container assembly 112 from the lip 48. Illustratively, the permeable housing 122 may be formed of a mesh 134 supported by a frame 136, with each being formed from a metal or plastic, or another like material. The mesh 134 may be constructed of nylon mesh or metal mesh, or any other type of reusable material capable of holding the tea material 12 while allowing a flow of heated liquid 46 through the mesh 134. The mesh 134 acts to enclose the tea material 12 to retain the tea material 12 in the permeable housing 122. Unlike filter paper, the mesh 134 may be cleaned and reused on multiple occasions.

The permeable housing 122 further illustratively includes two half domes 138 which can be connected together and disconnected from one another so as to respectively enclose the tea material 12 therein and/or, to allow access to the interior of the permeable housing 122 so as to allow a user to fill the interior with tea material 12. Optionally, an internal subdivider assembly 140 may be provided within the internal space of the permeable housing 122 to provide measuring and portion control features to the user when filling the permeable housing 122. The permeable housing 122 offers thus a reusable alternative, over paper filters which may be used in the beverage cartridge 14 embodiment described herein above for example, to a user using the apparatus for forming a beverage 10. The user simply has to load the permeable housing 122 with a tea material 12, hang the container assembly 112 from the lip 48 of the vessel, fill the vessel 18 with the liquid 46, place the vessel 18 beneath the overhang 28 such that the nozzle 78 is within the internal space 54 of the vessel 18, prior to the apparatus for forming a beverage 10 being operated to form a beverage. In accordance with an embodiment, the container assembly 112 may alternatively be suspended within the internal space 54 of the vessel 18 by supporting the container assembly 112 from an associated beverage forming machine, such as the apparatus for forming a beverage 10.

Figure 11:
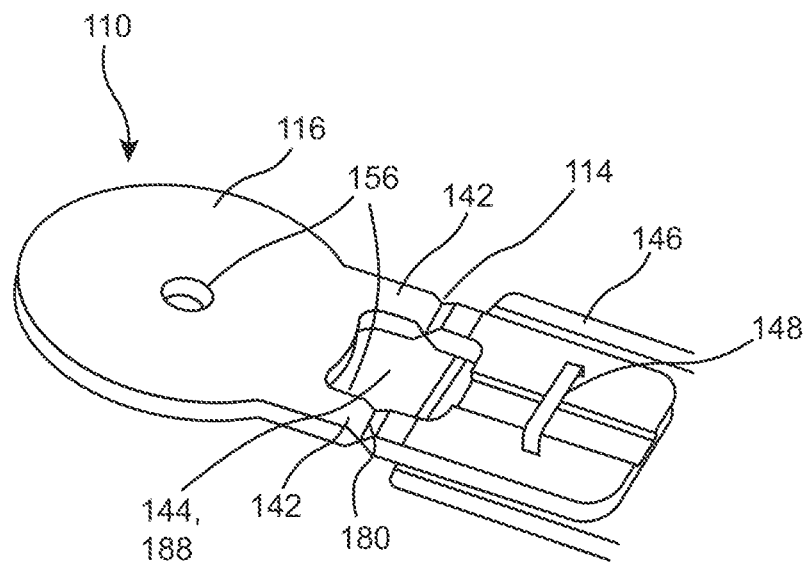
FIG. 11 is a side perspective view of a frangible portion of a beverage cartridge, in accordance with an illustrative embodiment.
Figure 12:
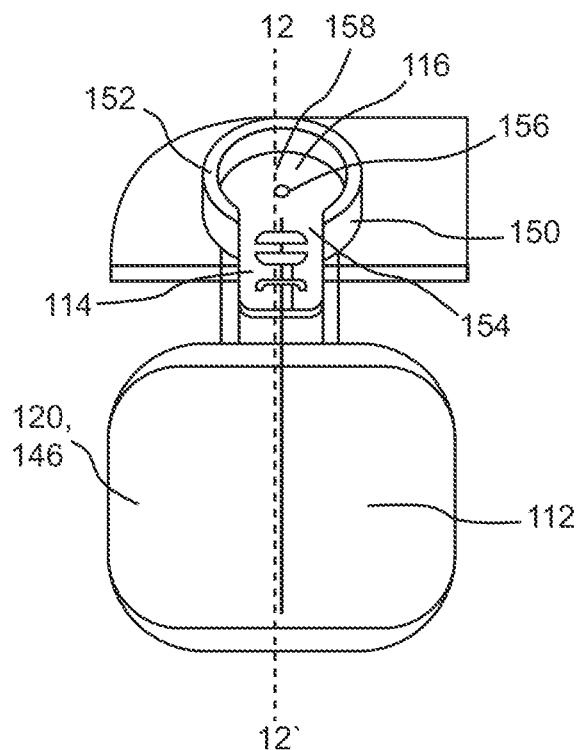
FIG. 12 is a front perspective view of a beverage cartridge removably connected to the housing of an apparatus for forming a beverage, in accordance with an illustrative embodiment.
Figure 13:
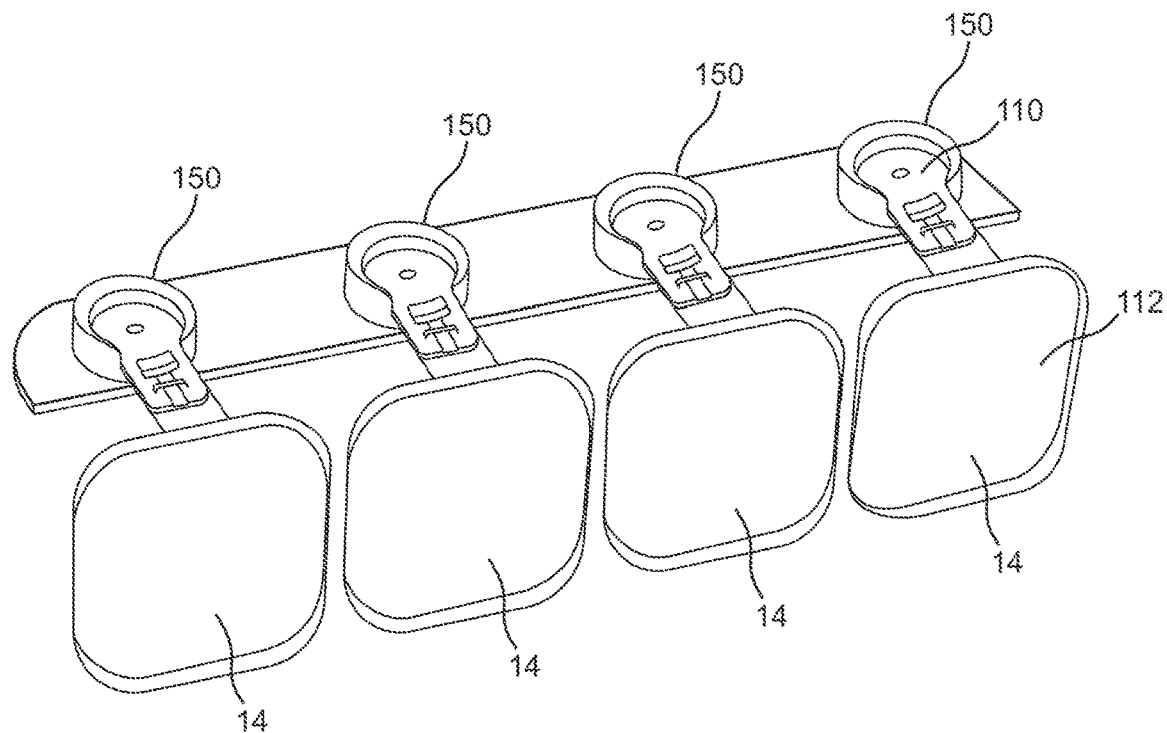
FIG. 13 is a top perspective view of multiple beverage cartridges connected to the housing of an apparatus for forming a beverage, in accordance with an illustrative embodiment.

Now referring to FIG. 11, FIG. 12, and FIG. 13, in addition to FIGS. 10A and 10B, in accordance with an embodiment, the frangible portion 114 includes two extending prongs 142 each connectable and extending between the connection assembly 110 and the container assembly 112, defining a void 144 within the same plane as the extending prongs 142. In the illustrated embodiment the connection assembly 110, the prongs 142, and the container assembly 112 maybe integrally formed to connect them together, for example by being formed from the same plastic material through injection molding, but other configurations are possible. Illustratively, the connection assembly 110, the container assembly 112, and the frangible portion 114 may extend within the same plane. As illustrated in FIG. 13, the connection assembly 110 is provided at a right angle to the plane of the container assembly 112 and the frangible portion 114. The desired orientation may depend on the construction of the container assembly 112 relative to the connection assembly 110. As illustrated, in accordance with an embodiment, the container assembly 112 is made of a filter material surrounding a portion of the frangible portion 114 which deforms under the force of gravity so as to hang from the frangible portion 114 at a right angle. Other configurations, orientations, and angles may otherwise be provided, with such configurations aiding with the dimensioning and operation of the cartridge chamber 16.

Still referring to FIG. 10A, 10B, FIG. 11 and FIG. 12, in accordance with an embodiment of the beverage cartridge 14, the container assembly 112 includes a permeable tea bag 146 containing the tea material 12. Illustratively, the permeable tea bag 146 is connected to the frangible portion 114 by a staple 148. While the container 120 is illustrated to be connected to the frangible portion 114 with a staple 148, other types of connections are possible, for example by using an adhesive, or a heat pressed connection, or the like. In some cases, the frangible portion 114 may be formed with the connection assembly 110 and the container assembly 112, in that the connection assembly 110 or the container assembly 112 may be frangible so as to separate the connection assembly 110 and the container assembly 112.

Now referring to FIG. 13, in addition to FIG. 1 and FIG. 12, the beverage cartridge 14 includes a connection assembly 110 configured to be removably securable to the apparatus for forming a beverage 10. The cartridge chamber 16 illustratively includes a fitting 150 configured to receive the connection assembly 110 or a portion of the connection assembly 110. The fitting 150 is formed within the cartridge chamber 16, and maybe be integrally formed or be formed separately as an insert into the cartridge chamber 16. Illustratively, the fitting 150 includes an upstanding wall 152 dimensioned to receive connection assembly 110 such that the upstanding wall 152 and the perimeter of the tab 116 abut to frictionally engage to provide a snug fitting. The upstanding wall 152 is illustratively circularly shaped to receive a similarly circularly shaped tab 116 and includes a wall opening 154 corresponding in dimension to the frangible portion 114 to allow the frangible portion 114 to pass between the upstanding wall 152 while allowing the perimeter of the tab 116 to abut the upstanding wall 152. Such a fitting illustratively allows the connection assembly 110 to be removably securable to the cartridge chamber 16. The meaning of "removably securable" refers to the ability of the connection assembly 110 to be temporarily connected to the cartridge chamber 16, and disconnected from the cartridge chamber 16. For example, the connection assembly 110 may be secured when the beverage cartridge 14 is being loaded into the cartridge chamber 16 before a beverage forming cycle, and removed from cartridge chamber 16 after the beverage formation cycle has been completed.

In accordance with an embodiment of the beverage cartridge 14, the connection assembly 110 includes the tab 116, the tab 116 includes an aperture 156 configured to slidably engage with and disengage from a corresponding post 158 provided in the cartridge chamber 16. Illustratively, the post 158 is centered within and surrounded by the upstanding wall 152 of the fitting 150.

Now referring to FIG. 14A, FIG. 14B, FIG. 15A, and FIG. 16, in addition to FIG. 5, in accordance with an embodiment, the apparatus for forming a beverage 10 further includes a chamber lid 32 that is movable between an opened and a closed position to open and close the cartridge chamber 16, the cartridge chamber 16 adapted to substantially enclose the beverage cartridge 14 when the chamber lid 32 is in a closed position and to engage the beverage cartridge 14 to separate the tea material 12 from the beverage cartridge 14 in response to the closing of the cartridge chamber.

In accordance with an embodiment, the apparatus for forming a beverage 10 includes a separator 170 for separating portion of the beverage cartridge 14 containing the tea material 12 from the beverage cartridge 14. In accordance with an embodiment, the separator 170 separates the tea material 12 from the beverage cartridge 14 by applying a cutting action to the beverage cartridge 14. In the illustrated embodiment, the separator 170 is a blade 172 which imparts a cutting action upon the beverage cartridge 14. Of note, other types of utensils may be employed. The separator 170 or blade 172 illustratively imparts a cutting action upon the frangible portion 114 so as to break it to cause the connection assembly 110 and the container assembly 112 to be separated. In accordance with an embodiment, the separator 170 is provided on the chamber lid 32 and acts upon the beverage cartridge 14 in response to the closing of the cartridge chamber 14. For example, the blade 172 is provided on a lid underside 174 and is positioned to cut the frangible portion 114 when the chamber lid 32 is closed. The blade 172 may be formed from a metal or hard plastic, or the like, of sufficient strength so as to be able to break the frangible portion 114 without causing any deformation or damage to the blade 172.

Figure 14:
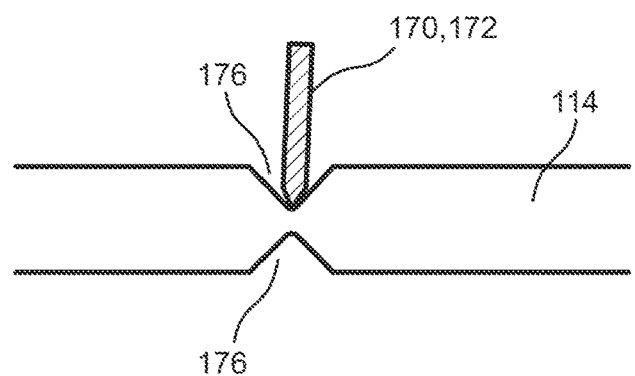
FIG. 14A is a side close-up view of a frangible portion of a beverage cartridge being separated by a blade, in accordance with an illustrative embodiment.
FIG. 14B is a side close-up view of a frangible portion of a beverage cartridge being separated and deformed by a blade, in accordance with an illustrative embodiment.
Figure 14B:
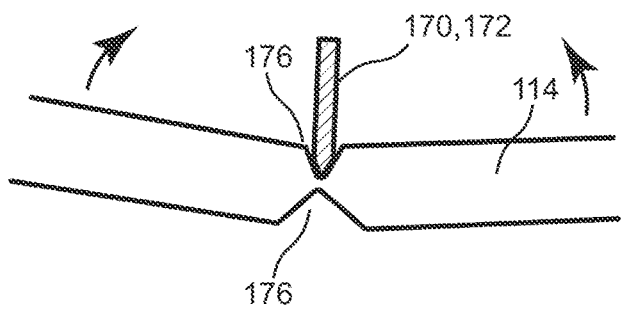
Figure 15A:
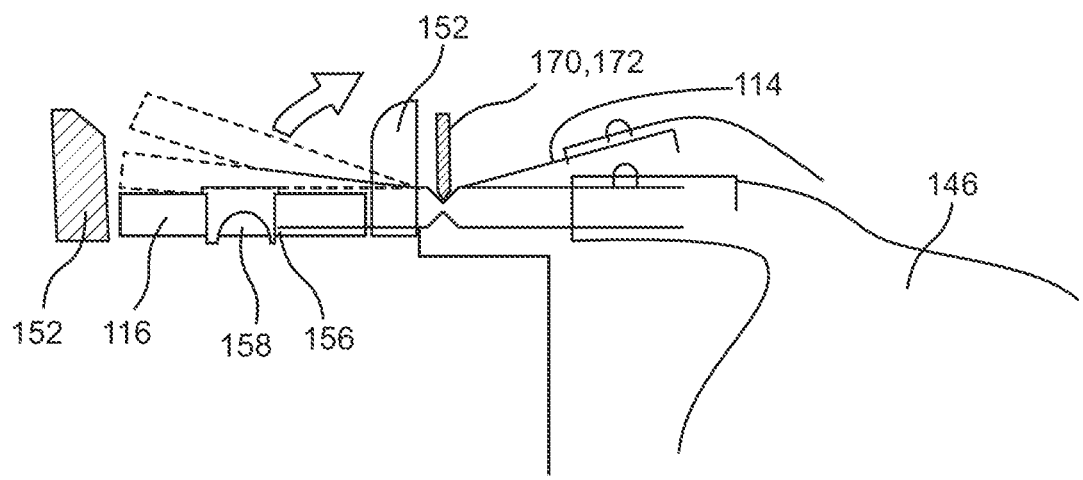
FIG. 15A is a side cut-away view, taken along the line 12-12' of FIG. 12, of a beverage cartridge removably connected to the cartridge chamber, in accordance with an illustrative embodiment.
Figure 15B:
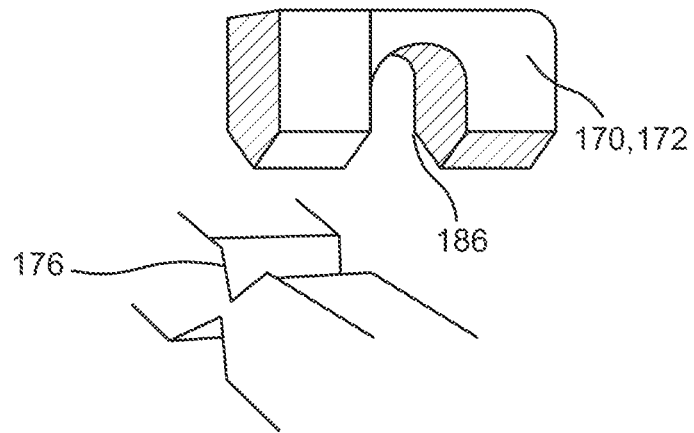
FIG. 15B is a front perspective view of a blade, in accordance with an illustrative embodiment.
Figure 16:
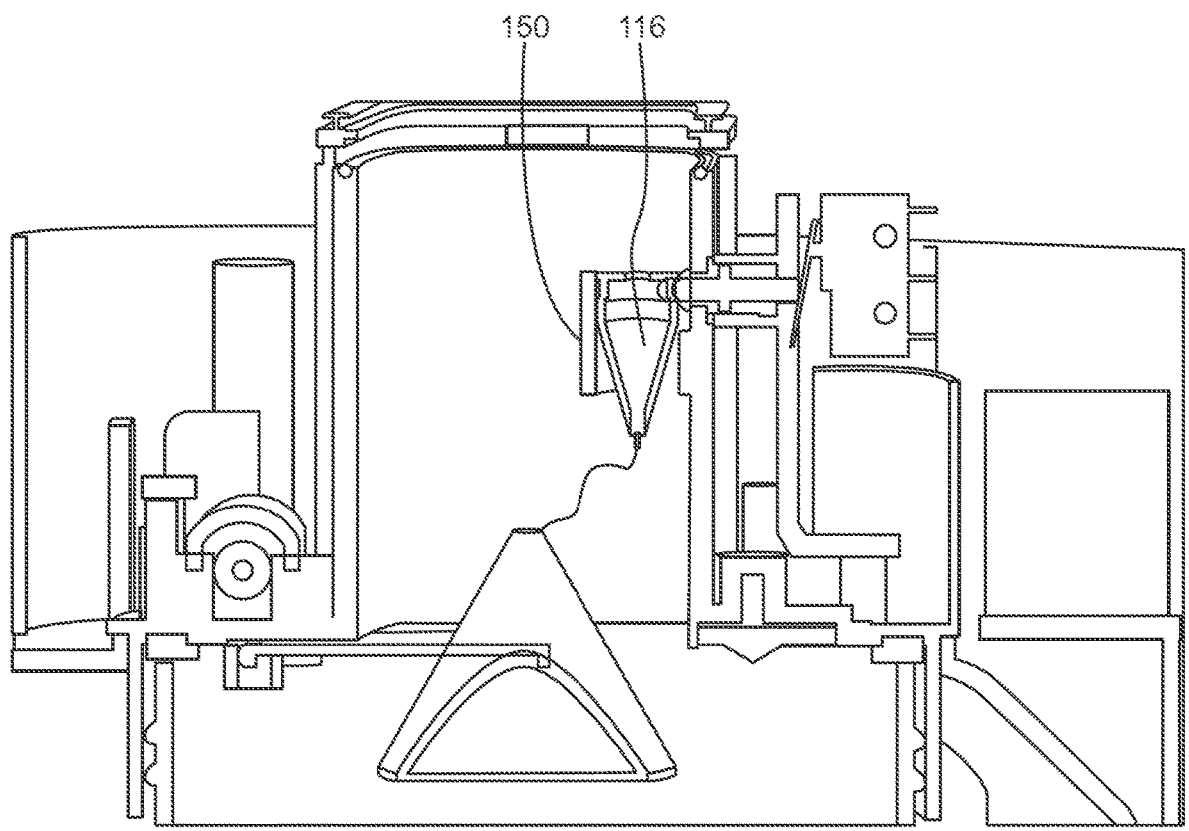
FIG. 16 is a side cut-away view of a beverage cartridge removably connected to the cartridge chamber, in accordance with an illustrative embodiment.

Still referring to FIG. 14A, FIG. 14B, FIG. 15A, FIG. 15B, FIG. 16, in accordance with an embodiment, the beverage cartridge 14 may include a frangible portion 114 that includes opposed fracture recesses 176. The opposed fracture recesses 176 may each comprise a v-shaped indent cross-section which correspond to the cross-section of the blade 172 to assist with the cutting action of the blade 172 upon the frangible portion 114. Alternatively, the opposed fracture recesses 176 may be configured to be wider than the cross-section of the blade 172 to allow the tab 116 to move under an action of the blade 172 on the recesses 176. Such a configuration may allow the tab 116 to lift upon action of the blade 172 on the fracture recesses 176, as illustrated in FIG. 14B and FIG. 15A. While two opposed fracture recesses 176 have been illustrated on opposite sides of the frangible portion 114, the opposed fracture recesses 176 may be provided on only one side and in a continuous or discontinuous manner along the length or width, or other orientation, of the frangible portion 114. Alternatively, as illustrated in FIG. 16, the tab 116 may be in the shape of a cone that is removably latched in a spring-loaded snap fitting holder 150 also in the shape of an inverted cone.

In accordance with an embodiment of the apparatus for forming a beverage 10, the separator 170 includes a pair of opposed blades as in 172 (not shown) associated with the apparatus for forming a beverage 10, each blade 172 actionable on opposed sides of the frangible portion 114. For example, one of the opposed blades 172 may be provided on the chamber lid 32 while the other be provided on the cartridge chamber 16 opposed to the blade 172 on the chamber lid 32, so as to act on the frangible portion 114 when the chamber lid 32 is in a closed position.

Figure 18:
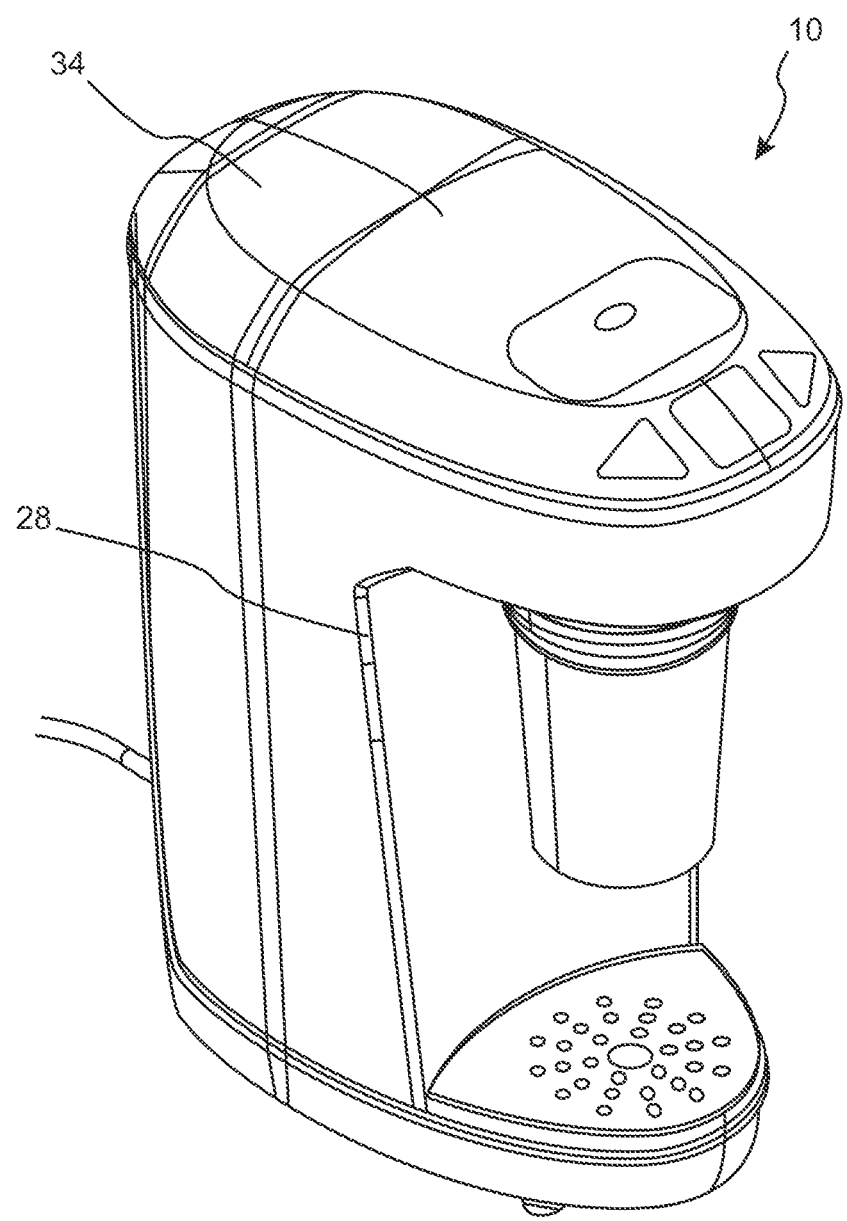
FIG. 18 is a perspective view of an apparatus for forming a beverage, in accordance with an illustrative embodiment.

Of note, while the separator 170 has been illustrated as acting upon the frangible portion 114 in response to the closing of the chamber lid 32, other configurations for the separator 170 for separating the portion containing the tea material 12 from the beverage cartridge 14 for deposit into the vessel 18 may also be provided. For example, in accordance with an alternate embodiment, the separator 170 may separate the portion containing the tea material 12 from the beverage cartridge 14 by applying a twisting action to the beverage cartridge 14. In accordance with an embodiment, the frangible portion 114 is configured to be separated by a differential torque applied by the separator 170 between the connection assembly 110 and the container assembly 112. Additionally, while the blade 172 has been illustrated to be positioned on the chamber lid 32, it may be positioned in other configurations so as to impart a cutting action on the frangible portion 114 or other part of the beverage cartridge 14. Additionally, the cartridge chamber 16 may be adapted to separate the tea material 12 from the beverage cartridge 14 in response to the activation of a mechanism other than the chamber lid 32. For example, as illustrated in FIG. 18, the cartridge chamber 16 may be adapted to separate the tea material 12 from the beverage cartridge 14 in response to the activation of a sliding actuator 178 which moves the blade 172 to cut the frangible portion 114. Illustratively, the sliding actuator 178 may be provided on the upperside 34 of the overhang 28 and which can be activated by the user manually. An automated activation may also be provided and other means of activating the separator 170 to separate the portion containing the tea material 12 from the beverage cartridge 14 by applying a force to the beverage cartridge 14 may be provided.

Now referring back to FIGS. 10A and 10B, in accordance with an embodiment of the apparatus for forming a beverage 10, the beverage cartridge 14 includes a string 180 including a first string end 182 and a second string end 184, the first string end 182 connected to the connection assembly 110 and the second string end 182 attached or connected to the container assembly 112, for example it may be attached by glue, adhesive, or a knot. The string 180 may include a cotton type string, nylon, plastic, threaded or not, or other type of fiber or cable, rope, line, wire or connector type.

Now referring to FIG. 15B, in accordance with an embodiment, the separator 170 includes the blade 172, the blade 172 includes a blade notch 186 configured to allow the string 180 to pass through a portion of the blade 172 when the blade 172 is acting upon the beverage cartridge 14. Other arrangements of the blade 172 in order to allow the frangible portion 114 to be cut by the blade 172 while avoiding the blade 172 from cutting the string 180 may be provided. For example, the blade 172 may include two blades to cut the frangible portion 114 on either side of the string 180.

Now referring back to FIG. 10A, in accordance with an embodiment of the beverage cartridge 14, the string 180 is extended from a storage position within the container 120 and is dimensioned to suspend the container assembly 112 from the separated connection assembly 110 within the vessel 18. The term "storage position" refers to a compact temporary state or position of the string 180 to ensure that the beverage cartridge 14 remains easy to handle and manipulate. For example, this may include but not be limited to a raveling or furling of the string 180, internal or external to the beverage cartridge 14.

Figure 10C:
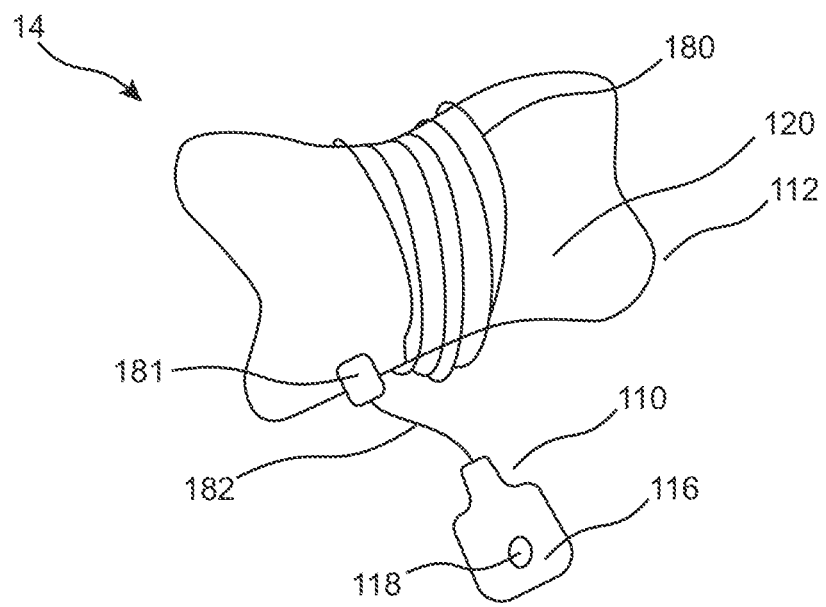
FIG. 10C is a front view of a beverage cartridge, in accordance with an illustrative embodiment.

Now referring back to FIG. 10C, in accordance with an embodiment of the beverage cartridge 14, the storage position includes the string 180 raveled around the container assembly 112, such that the string 180 unravels under the force of gravity when the container assembly 112 is separated from the connection assembly 110. Illustratively, the string 180 is temporarily secured, for example by tacking a portion of adhesive tack 181 on the string 180 and the container assembly 112. to the housing 120 when in the storage position which can be unsecured before loading the beverage cartridge 14 into the cartridge chamber 16, for example by tugging at the string 180. In accordance with this embodiment, the separator 170 may act upon beverage cartridge 14 to break the adhesive 181 tack to allow the string 180 to unravel.

Now referring back to FIG. 10A, FIG. 10B, and FIG. 14A, in accordance with an embodiment of the beverage cartridge 14, the frangible portion 114 includes a gap 188 disjointing the opposed fracture recesses 176, and a spool 190 for winding a portion of a string 180 thereabout in a storage position, the string 180 including the first string end 182 and the second string end 184, the first string end 182 attached to the connection assembly 110 and the second string end 184 attached to the container assembly 112, the spool 190 extending into the gap 188. Illustratively, the spool 182 is integrally formed with and from the same material as the frangible portion 144, the connection assembly 110, and/or the container assembly 112.

In accordance with an embodiment, a portion of the string 180 is stored in the container assembly 110, the container assembly 112 includes a string port 192 for allowing the portion of the string 180 to be drawn from within the container assembly 112 after the container assembly 112 and the connection assembly 110 have been separated. A knot, or other type of stopper (not shown) may be provided at the end of the string 180 to prevent the second string end 182 from becoming separated from the container assembly 112, which would cause the container assembly 112 to freely move within the vessel 18.

In accordance with an embodiment of the beverage cartridge 14, a retractable string 180 connected to the connection assembly 110 and the container assembly 112 may be provided, the retractable string 180 configured to extend under the weight of the container assembly 112 after the connection assembly 110 and the container assembly 112 are separated.

To form a beverage using the apparatus for forming a beverage 10, a user may move the chamber lid 32 from a closed position to an open position to expose the cartridge chamber 16 into which the beverage cartridge 14, or multiple beverage cartridges as in 14 as the case may be, may be inserted via the chamber input port 36, and there on the beverage cartridge 14 is placed into the cartridge chamber 16. For example, the connection assembly 110 is illustratively removably secured to the apparatus for forming a beverage 10, for example by snap fitting the tab 116 to the fitting 150. The chamber lid 32 may then be closed to at least partially of fully enclose the beverage cartridge 14 within the cartridge chamber 16. For example, a manual lever may be used to open and close the chamber lid 32, or the chamber lid 32 may be manipulated directly by hand. The reservoir 64 is initially provided with water 66 by the user, who provides the water 66 in the reservoir 64 using a water tap or other supply source. A vessel 18, such as a cup or other suitable receptacle, is illustratively filled with the liquid 46, such as milk, and placed on a drip tray or shelf 26 or is removably connected to the housing 20 via the chamber port interface 60 for example by a rotation of the vessel 18 so that the protruding latches 62 lock with the corresponding locking notches 58. When the vessel 18 is so removably connected, the chamber output port 38 is adjacent to the opening of the vessel 18. After connection of the vessel 18 to the housing 20, the lever assembly 86 of the actuator 84 may be moved in a manual or automatic manner so as to impart a corresponding movement of the nozzle 78 to a desired depth within the vessel 18. Alternatively, the travel of the lever assembly 86 may be physically restricted by the length of the slot 85 which may in turn limit a corresponding movement of the nozzle 78.

The operation of the boiler 68 and other components of the apparatus for forming a beverage 10 may be controlled by the controller 102 which may be automatic upon closing of the chamber lid 32, or may be initiated by the user pushing the buttons 106 to activate a beverage formation cycle. For example, the controller 102 may start operation in an automated way, for example based on a detection of the presence of a beverage cartridge 14 in the cartridge chamber 16 or the closing of the chamber lid 32. The components such as the boiler 68 will be controlled by the controller 102 to operate to deliver a metered amount of steam 70 into the vessel 18 via the nozzle 78 to heat the liquid 46 and thus prepare the liquid 46 for the formation of the beverage. The controller 102 may also start operation of the pump 76, drawing liquid from the water supply line 74 and discharging the steam 70 via the nozzle output 82. Valves (not shown) may be opened or closed to deliver a suitable portion of the water 66 to the boiler 68. Operation, including the delivery of steam 70 to the vessel 18, may continue for a preset amount of time, or based on other conditions, such as a detected temperature of the liquid 46, as detected by the temperature sensor 100, or other parameters or sensors. During operation, the amount of steam 70 provided to the vessel 18 may be controlled such that the boiler 68 outputs an amount of steam 70 sufficient to heat the liquid 46 contained in the vessel 18. Control of the steam 70 provided to the vessel 18 may be made based on a timing duration, for example valves (not shown) may be opened or closed for a period of time to allow the liquid 46 to reach a predetermined temperature for the formation of the beverage, based on the detected or sensed temperature of the liquid 46 as measured by the temperature sensor 100. The frangible portion 114 may be broken by the blade 172 acting on the frangible portion 114 in response to the closing of the cartridge chamber 16 to separate the container assembly 112 from the connection assembly 110, or by another action applied to the beverage container 16. The separated container assembly 112 may drop onto the door surface 44 of the door 42 when the door 42 is in a closed position. After the liquid 46 has reached brewing temperature, the door 42 may be controlled by the controller 102 to open and the container assembly 112 drops under the force of gravity into the internal space 54 of the vessel 18 where it is suspended by the string 180 in the liquid 46. The controller 102 may then control the boiler 68 such that the steam 70 maintains the liquid 46 at a warming temperature by delivering a warming heat to allow the tea material 12, for example black tea, to infuse with the liquid 46, for example milk, to form a chai tea for example.

Once the beverage has been formed, for example by allowing the tea material 12 to steep in the heated liquid 46 for a period of time, and in the case of using milk as the liquid 46 and black tea as the tea material 12 to form chai tea, the chamber lid 32 may be opened and the beverage cartridge 14 removed from the cartridge chamber 16 by the action of the user pulling on the string 180 to draw the container assembly 112 out of the liquid 46. The user may further tug at the string 180 and cause the tab 116 to disengage from the fitting 150. The beverage cartridge 14 may be subsequently discarded and the vessel 18 removably disconnected from the chamber port interface 60 by a rotation of the vessel 18. The beverage may be transferred from the vessel 18 to another receptacle or the user may consume the beverage directly from the vessel 18.

Figure 19:
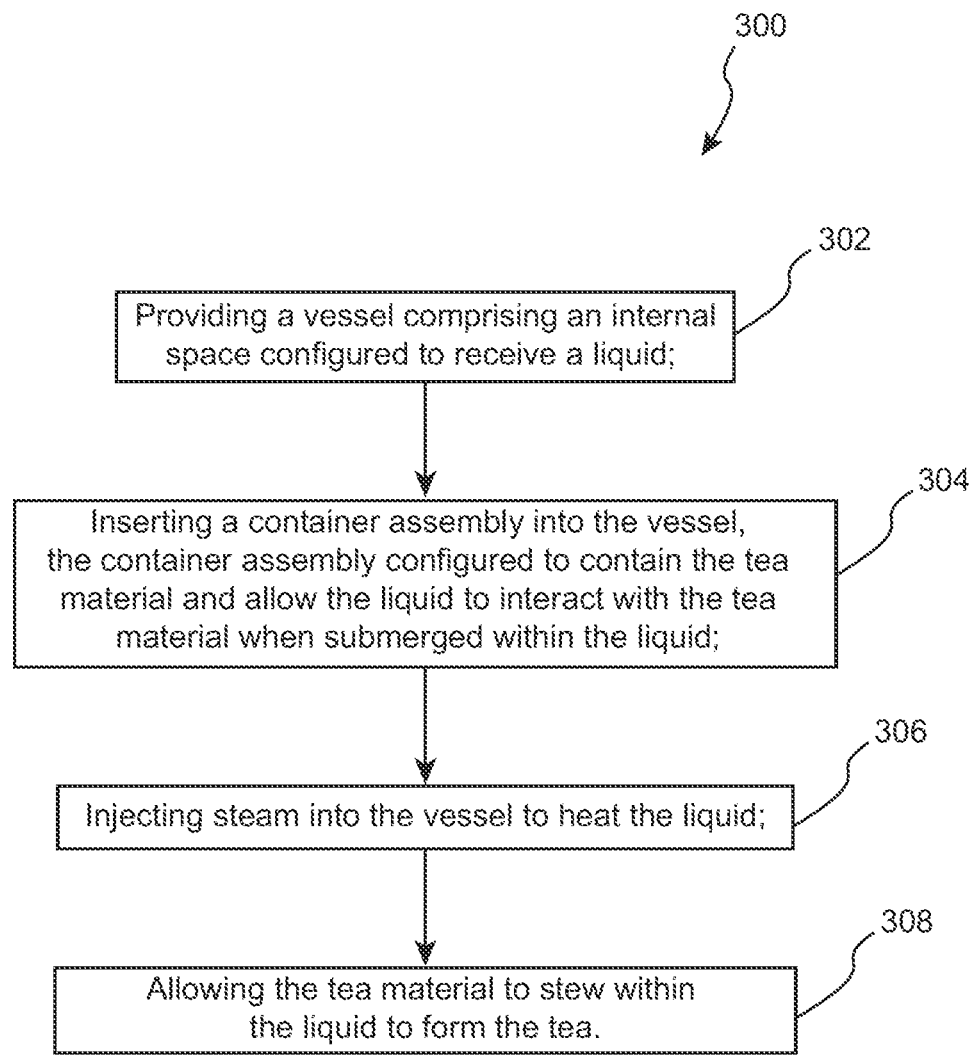
FIG. 19 is a flow diagram of a method for forming tea using a tea material, in accordance with an illustrative embodiment.

Now referring to FIG. 19, there is illustrated a method for forming tea using a tea material 300, the method 300 including the steps of providing a vessel including an internal space configured to receive a liquid 302; inserting a container assembly into the vessel, the container assembly configured to contain the tea material and allow the liquid to interact with the tea material when submerged within the liquid 304; injecting steam into the vessel to heat the liquid 306; and allowing the tea material to stew within the liquid to form the tea 308.

In accordance with an embodiment, the method for forming tea using a tea material 300 further includes suspending the container assembly within the internal space of the vessel when allowing the tea material to stew within the liquid to form the tea.

In accordance with an embodiment of the method for forming tea using a tea material 300, the vessel includes a cup. The cup includes a base, a lip, and a side wall between the lip and the base defining the internal space, such that suspending the container assembly within the internal space of the cup includes supporting the container assembly from the lip.

In accordance with an embodiment of the method for forming tea using a tea material 300, the container assembly includes a permeable housing configured to house the tea material; and a handle including a first end including a hook configured to engage the lip of the cup to support the permeable housing within the internal space of the cup at a predetermined distance from the lip; and a second end in connection with the permeable housing.

In accordance with an embodiment of the method for forming tea using a tea material 300, the step of suspending the container assembly within the internal space of the vessel further includes supporting the container assembly from an associated beverage forming machine.

In accordance with an embodiment of the method for forming tea using a tea material 300, the step of injecting steam into the vessel to heat the liquid 306 includes inserting a nozzle into the vessel, the nozzle includes a nozzle output configured to output the steam.

In accordance with an embodiment of the method for forming tea using a tea material 300, the step of injecting steam into the vessel includes inserting a nozzle into the vessel.

In accordance with an embodiment of the method for forming tea using a tea material 300, the step of injecting steam into the vessel to heat the liquid 306 further includes positioning the nozzle output proximate to a bottom of the vessel.

In accordance with an embodiment of the method for forming tea using a tea material 300, there is further provided the step of controlling the injecting of steam between a steaming mode to heat the liquid and a simmering mode to maintain the liquid at a predetermined temperature.

In accordance with an embodiment of the method for forming tea using a tea material 300, allowing the tea material to stew within the liquid includes allowing the tea material to stew within the liquid for a duration ranging between 3 to 8 minutes.

In accordance with an embodiment of the method for forming tea using a tea material 300, injecting steam dilutes the liquid with water up to approximately a 50% volume the liquid.

In accordance with an embodiment of the method for forming tea using a tea material 300, the tea material is black tea and the liquid is milk.

Figure 20:
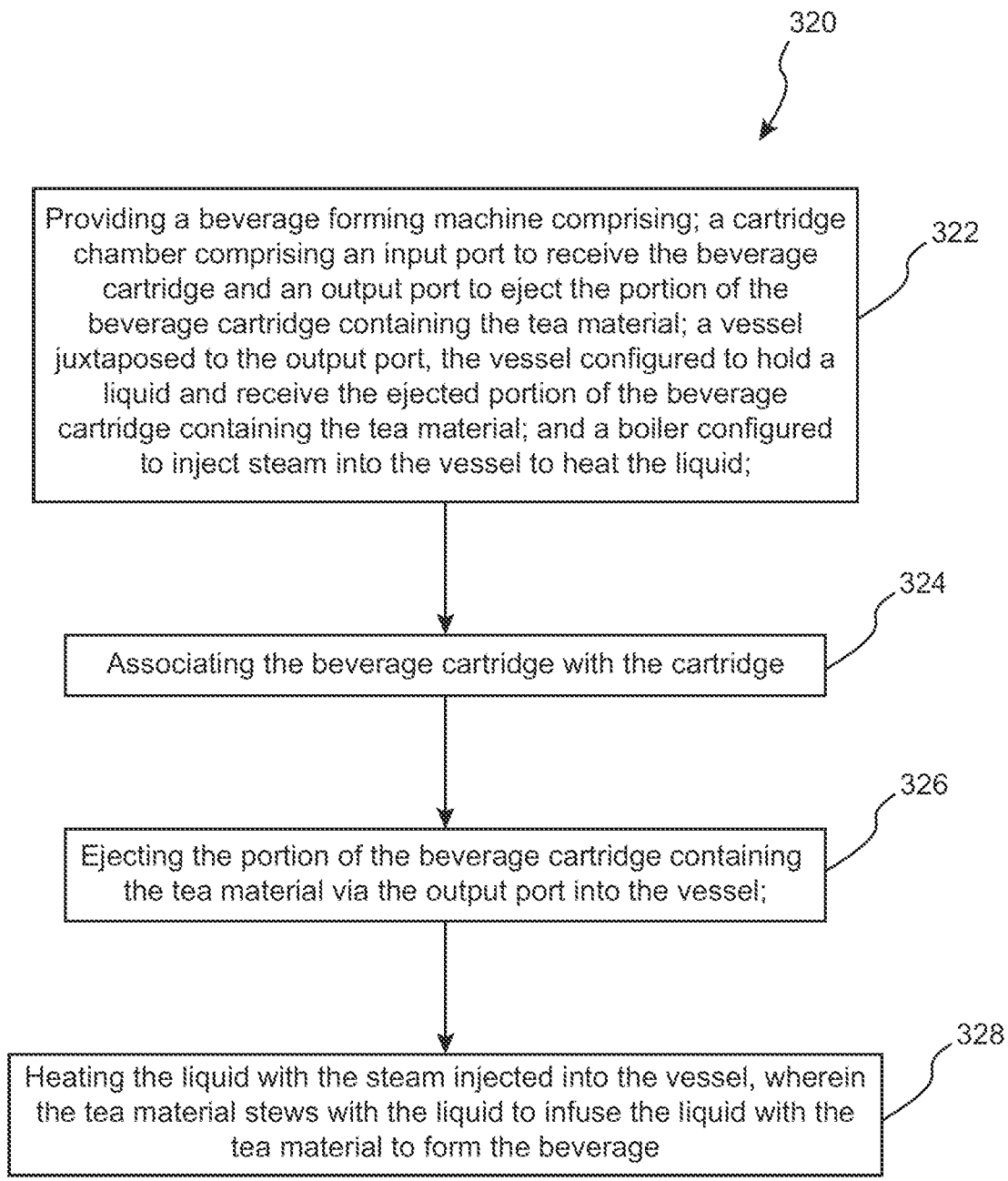
FIG. 20 is a flow diagram of a method for forming a beverage using a beverage cartridge, in accordance with an illustrative embodiment.

Now referring to FIG. 20, there is provided a method for forming a beverage using a beverage cartridge including a tea material contained within a portion of the beverage cartridge 320. The method 320 includes providing a beverage forming machine 322 including a cartridge chamber including an input port to receive the beverage cartridge and an output port to eject the portion of the beverage cartridge containing the tea material, a vessel juxtaposed to the output port, the vessel configured to hold a liquid and receive the ejected portion of the beverage cartridge containing the tea material, and a boiler configured to inject steam into the vessel to heat the liquid. The method 320 further includes associating the beverage cartridge with the cartridge chamber 324; ejecting the portion of the beverage cartridge containing the tea material via the output port into the vessel 326; and heating the liquid with the steam injected into the vessel 328, such that the tea material stews with the liquid to infuse the liquid with the tea material to form the beverage.

In accordance with an embodiment, the method for forming a beverage using a beverage cartridge including a tea material contained within a portion of the beverage cartridge 320 further includes closing the cartridge chamber to at least partially enclose the beverage cartridge.

In accordance with an embodiment, the method for forming a beverage using a beverage cartridge including a tea material contained within a portion of the beverage cartridge 320 further includes separating the portion of the beverage cartridge containing the tea material from the beverage cartridge using a utensil actionable on the beverage cartridge in response to the closing of the cartridge chamber.

In accordance with an embodiment, the method for forming a beverage using a beverage cartridge including a tea material contained within a portion of the beverage cartridge 320 further includes separating the portion of the beverage cartridge containing the tea material from the beverage cartridge by applying a torque to the beverage cartridge in response to the closing of the cartridge chamber.

In accordance with an embodiment, the method for forming a beverage using a beverage cartridge including a tea material contained within a portion of the beverage cartridge 320 further includes suspending the portion of the beverage cartridge containing the tea material within the vessel by a string extending from the cartridge chamber.

In accordance with an embodiment, the method for forming a beverage using a beverage cartridge including a tea material contained within a portion of the beverage cartridge 320 further includes connecting the vessel to the beverage forming machine such that the cartridge chamber and the vessel in communication via the output port.

In accordance with an embodiment, the method for forming a beverage using a beverage cartridge including a tea material contained within a portion of the beverage cartridge 320 further includes connecting the vessel to the beverage forming machine such that the cartridge chamber and the vessel are fluidly sealed.

In accordance with an embodiment of the method for forming a beverage using a beverage cartridge including a tea material contained within a portion of the beverage cartridge 320, closing the cartridge chamber includes moving a lid associated with the beverage forming machine, the lid being movable between an open and a closed position to open and close the cartridge chamber, such that the movement of the lid to a closed position acts on the beverage cartridge to separate the portion of the beverage cartridge containing the tea material from the beverage cartridge.

In accordance with an embodiment of the method for forming a beverage using a beverage cartridge including a tea material contained within a portion of the beverage cartridge 320, heating the liquid with the steam injected into the vessel further includes inserting a double-walled steam nozzle within the vessel.

In accordance with an embodiment, the method for forming a beverage using a beverage cartridge including a tea material contained within a portion of the beverage cartridge 320 further includes opening the output port to allow the portion of the beverage cartridge containing the tea material to be ejected subsequent to heating the liquid.

In light of the preceding, it can thus be appreciated that the apparatus and methods allow for the preparation of a beverage that is easy, quick and provides for minimum cleanup. Furthermore, it is also desirable from the standpoint of operating efficiency that the surfaces that are heated remain insulated from heat sources so that any liquid build-up on heated surfaces is prevented or minimized, as in the case of forming a chai tea where the formation of milk residue on the heated parts may occur, with such a residue being difficult to clean.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. An apparatus for forming a beverage in a vessel holding a liquid using a tea material contained within a portion of a beverage cartridge, the apparatus comprising:

a frame;

a cartridge chamber arranged to receive the beverage cartridge and to deposit the portion of the beverage cartridge containing the tea material into the vessel;

a reservoir for holding a supply of water;

a boiler supported by the frame in fluid communication with the reservoir, the boiler configured to generate steam from the water supplied from the reservoir;

a double-walled steam nozzle supported by the frame in fluid communication with the boiler, the double-walled steam nozzle configured to inject the steam into the vessel to heat the liquid while maintaining an exterior surface of the steam nozzle below the temperature of the steam, and causing the deposited tea material to infuse the liquid and form the beverage within the vessel;

a temperature sensor associated with the nozzle, the temperature sensor configured to sense the temperature of the liquid in the vessel and provide a sensed temperature signal indicative thereof; and a controller in signal communication with the temperature sensor to control the boiler to adjust the steam flow and alter the temperature of the liquid, wherein the controller controls the boiler to alter the steam flow between a heating mode and a simmering mode in response to the sensed temperature of the liquid.

2. The apparatus for forming the beverage of claim 1, further comprising a separator for separating the portion containing the tea material from the beverage cartridge wherein the separator comprises a blade and a notch.

3. The apparatus for forming the beverage of claim 1, wherein the separator separates the portion containing the tea material from the beverage cartridge by applying a twisting action to the beverage cartridge.

4. The apparatus for forming the beverage of claim 1, wherein the beverage cartridge comprises:

a connection assembly configured to be removably securable to the apparatus for forming a beverage;

a tea packet/container configured to house the tea material;

a frangible portion connecting the tea packet/container and connection assembly, the frangible portion being breakable to separate the tea packet/container from the connection assembly.

5. The apparatus for forming the beverage of claim 4, wherein the beverage cartridge comprises: a string comprising a first end and a second end, the first end connected to the connection assembly and the second end attached to the tea packet/container.

6. The apparatus for forming the beverage of claim 4, wherein the separator comprises a pair of opposed blades associated with the apparatus for forming a beverage, each blade actionable on opposed sides of the frangible portion.

7. The apparatus for forming the beverage claim 1, wherein the double-walled steam nozzle comprises a nozzle output angled relative to the longitudinal axis of the vessel when the vessel is positioned adjacent to the cartridge to direct steam and agitate the liquid to form a circular vortex in the liquid.

8. The apparatus for forming the beverage of claim 7, wherein the double walled steam nozzle comprises an exterior insulating jacket and an interior conducting jacket.

9. The apparatus for forming the beverage of claim 1, wherein the liquid is milk, and the tea material is black tea.

* * * * *